US012581071B2

(12) United States Patent
Zhang et al.

(10) Patent No.: US 12,581,071 B2
(45) Date of Patent: Mar. 17, 2026

(54) INTERACTION OF MULTIPLE PARTITIONS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 78 days.

(21) Appl. No.: 18/483,111

(22) Filed: Oct. 9, 2023

(65) Prior Publication Data

US 2024/0040119 A1      Feb. 1, 2024

Related U.S. Application Data

(63) Continuation of application No. PCT/CN2022/085714, filed on Apr. 8, 2022.

(30) Foreign Application Priority Data

Apr. 9, 2021    (WO) ................ PCT/CN2021/086095

(51) Int. Cl.
*H04N 19/119*        (2014.01)
*H04N 19/124*        (2014.01)
            (Continued)

(52) U.S. Cl.
CPC ......... *H04N 19/119* (2014.11); *H04N 19/136* (2014.11); *H04N 19/176* (2014.11);
            (Continued)

(58) Field of Classification Search
CPC .... H04N 19/119; H04N 19/96; H04N 19/184; H04N 19/70; H04N 19/136; H04N 19/176; H04N 19/124
See application file for complete search history.

(56) References Cited

U.S. PATENT DOCUMENTS

2014/0211850 A1*   7/2014   Zhang .................... H04N 19/70
                                                        375/240.12
2017/0134749 A1*   5/2017   Park ..................... H04N 19/176
            (Continued)

FOREIGN PATENT DOCUMENTS

CN        110881129 A      3/2020
CN        111107367 A      5/2020
            (Continued)

OTHER PUBLICATIONS

Document: JVET-K0287-v1, Gao, H., et al., "CE1-2.0.11: Picture Boundary Handling," Joint Video Experts Team (JVET) of ITU-T SG 16 WP 3 and ISO/IEC JTC 1/SC 29/WG 11 11th Meeting: Ljubljana, SI, Jul. 10-18, 2018, 7 pages.
            (Continued)

*Primary Examiner* — Neil R Mikeska
(74) *Attorney, Agent, or Firm* — Conley Rose, P.C.

(57)        ABSTRACT

A mechanism and method for processing video data is disclosed. The video processing method includes applying a first partitioning scheme to a parent video unit to obtain a current video unit and performing a conversion between a video media data and a bitstream based on application of the first partitioning scheme.

18 Claims, 15 Drawing Sheets

(51) Int. Cl.

| | | |
|---|---|---|
| *H04N 19/136* | (2014.01) | |
| *H04N 19/176* | (2014.01) | |
| *H04N 19/184* | (2014.01) | |
| *H04N 19/70* | (2014.01) | |
| *H04N 19/96* | (2014.01) | |

(52) U.S. Cl.

CPC ........... *H04N 19/184* (2014.11); *H04N 19/70* (2014.11); *H04N 19/96* (2014.11); *H04N 19/124* (2014.11)

(56) References Cited

U.S. PATENT DOCUMENTS

| | | | |
|---|---|---|---|
| 2017/0208336 | A1 | 7/2017 | Li et al. |
| 2018/0103268 | A1* | 4/2018 | Huang ................... H04N 19/91 |
| 2018/0109812 | A1* | 4/2018 | Tsai ...................... H04N 19/157 |
| 2020/0252609 | A1* | 8/2020 | Filippov ................ H04N 19/33 |
| 2020/0288175 | A1* | 9/2020 | Chang ................... H04N 19/52 |
| 2020/0304788 | A1* | 9/2020 | He ........................ H04N 19/117 |
| 2021/0314624 | A1* | 10/2021 | Coban .................. H04N 19/174 |
| 2022/0046239 | A1* | 2/2022 | Lin ....................... H04N 19/103 |
| 2024/0040119 | A1* | 2/2024 | Zhang .................. H04N 19/119 |

FOREIGN PATENT DOCUMENTS

| | | |
|---|---|---|
| CN | 112235568 A | 1/2021 |
| WO | 2016091161 A1 | 6/2016 |
| WO | 2020182182 A1 | 9/2020 |

OTHER PUBLICATIONS

Document: JVET-S2001-vG, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 544 pages.

Sullivan, G., et al., "Overview of the High Efficiency Video Coding (HEVC) Standard," IEEE Transactions on Circuits and Systems for Video Technology, vol. 22, No. 12, Dec. 2012, 20 pages.

Luthra, A., et al., "Overview of the H.264/AVC video coding standard," Proceedings of SPIE vol. 5203 Applications of Digital Image Processing XXVI, Nov. 19, 2003, 16 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WVG 11 7th Meeting: Torino, IT, Jul. 13- 21, 2017, 50 pages. Retrieved from the internet: https://jvet.hhi.fraunhofer.de/svn/svn_ HMJEMSoftware/tags/ HM-16.6-JEM-7.0, Jan. 18, 2024, 1 page.

"Series H: Audiovisual and multimedia systems Infrastructure of audiovisual services—Coding of moving video High efficiency video coding," Recommendation ITU-T H.265 (V9), Sep. 2023, 718 pages.

Document: JVET-D0117r1, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.

Retrieved from the internet: Patent for binary tree: https://patentscope. wipo.int/search/en/detail.jsf;jsessionid= B6F96E719C3DECA6BB5B0830F82F2478.wapp1nC?docId= WO2016091161&recNum=1&maxRec=&office=&prevFilter= &sortOption=&queryString=&tab=FullText#fig0004, Jan. 18, 2023, 7 pages.

Document: JVET-J1001-v2, Bross, B., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.

Budagavi, M., et al., "Core Transform Design for the High Efficiency Video Coding (HEVC) Standard," IEEE Journal of Selected Topics in Signal Processing, vol. 7, No. 6, Dec. 2013, 13 pages.

Retrieved from the internet: http://www.avs.org.cn/english/, Jan. 18, 2024, 3 pages.

International Search Report from PCT Application No. PCT/CN2022/ 085714 dated Jul. 6, 2022, 11 pages.

* cited by examiner

200

Macroblock Partitions

16x16     16x8     8x16     8x8

Macroblock Modes

0

0
1

0     1

0     1
2     3

8x8     8x4     4x8     4x4

8x8 Modes

0

0
1

0     1

0     1
2     3

300

CB Partitions

MxM     M/2 x M     MxM/2     M/2xM/2

M/4 x M (L)     M/4 x M (R)     M x M/4 (U)     M x M/4 (D)

400

Macroblock Partitions

403

401

500

QTBT Partitions

503

501

800

FT Partitions 801          803          805          807

900

GTT Partitions 901          903

Boundary Partitioning Tree

1000

1300

1400

1500

1502

1510

1600

1700

1702 — Applying a first partitioning scheme to a parent video unit to obtain a current video unit.

1704 — Performing a conversion between a video media data and a bitstream based on application of the first partitioning scheme.

1800

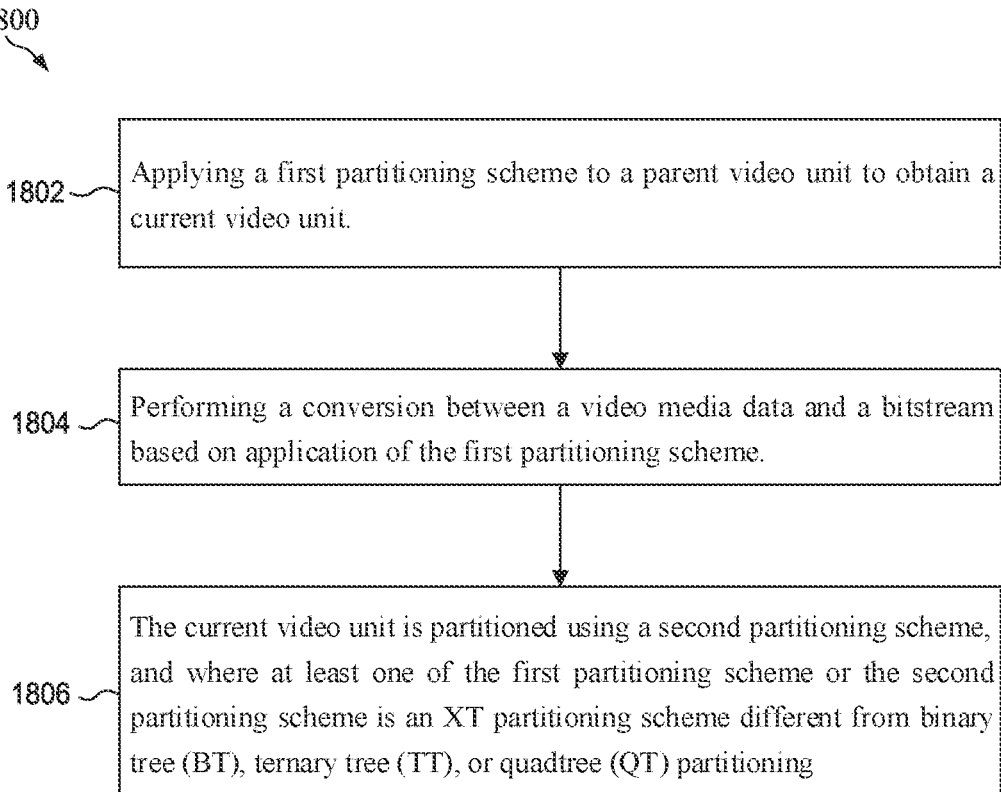

1802 ~ Applying a first partitioning scheme to a parent video unit to obtain a current video unit.

1804 ~ Performing a conversion between a video media data and a bitstream based on application of the first partitioning scheme.

1806 ~ The current video unit is partitioned using a second partitioning scheme, and where at least one of the first partitioning scheme or the second partitioning scheme is an XT partitioning scheme different from binary tree (BT), ternary tree (TT), or quadtree (QT) partitioning

FIG. 18

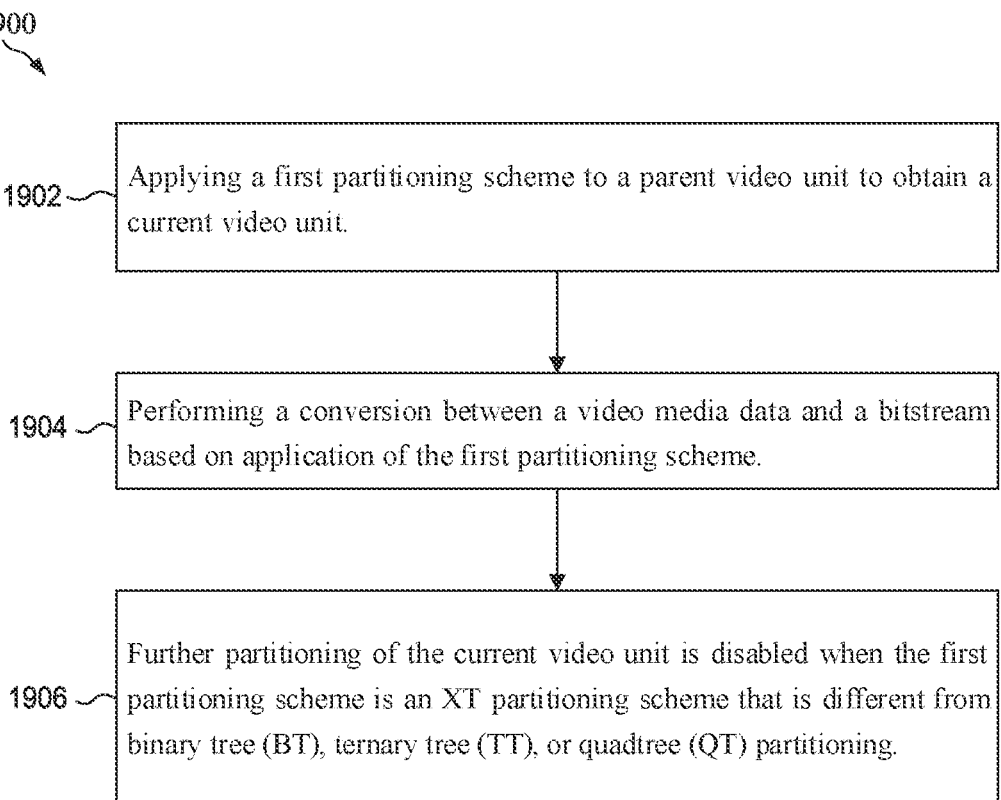

1900

1902 — Applying a first partitioning scheme to a parent video unit to obtain a current video unit.

1904 — Performing a conversion between a video media data and a bitstream based on application of the first partitioning scheme.

1906 — Further partitioning of the current video unit is disabled when the first partitioning scheme is an XT partitioning scheme that is different from binary tree (BT), ternary tree (TT), or quadtree (QT) partitioning.

INTERACTION OF MULTIPLE PARTITIONS

CROSS-REFERENCE TO RELATED APPLICATIONS

This patent application is a continuation of International Patent Application No. PCT/CN2022/085714, filed on Apr. 8, 2022, which claims the benefit of International Application No. PCT/CN2021/086095, filed on Apr. 9, 2021. All the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising applying a first partitioning scheme to a parent video unit to obtain a current video unit; and performing conversion between a video media data and a bitstream based on application of the first partitioning scheme.

Optionally, another implementation of the aspect provides that the current video unit is partitioned using a second partitioning scheme, and wherein at least one of the first partitioning scheme or the second partitioning scheme is an XT partitioning scheme different from binary tree (BT), ternary tree (TT), or quadtree (QT) partitioning.

Optionally, in any of the preceding aspects, another implementation of the aspect provides that the XT partitioning scheme is an unsymmetrical binary tree partitioning (UBT), an unsymmetrical quadtree partitioning (UQT), an extended quadtree (EQT), or an extended ternary tree (ETT) partitioning scheme.

Optionally, in any of the preceding aspects, another implementation of the aspect provides that the first partitioning scheme is BT, TT, QT, UBT, UQT, EQT, or ETT.

Optionally, in any of the preceding aspects, another implementation of the aspect provides that the second partitioning scheme is BT, TT, QT, UBT, UQT, EQT, or ETT.

Optionally, in any of the preceding aspects, another implementation of the aspect provides that the current video unit is partitioned using a second partitioning scheme, and wherein at most one of the first partitioning scheme or the second partitioning scheme is an XT partitioning scheme that is different from binary tree (BT), ternary tree (TT), or quadtree (QT) partitioning.

Optionally, in any of the preceding aspects, another implementation of the aspect provides that the XT partitioning scheme is an unsymmetrical binary partitioning (UBT) or an unsymmetrical quadtree partitioning (UQT) or an extended quadtree (EQT) or an extended ternary tree (ETT) partitioning scheme.

Optionally, in any of the preceding aspects, another implementation of the aspect provides that the first partitioning scheme is BT, TT, QT, UBT, UQT, EQT, or ETT.

Optionally, in any of the preceding aspects, another implementation of the aspect provides that the second partitioning scheme is BT, TT, QT, UBT, UQT, EQT, or ETT.

Optionally, in any of the preceding aspects, another implementation of the aspect provides that further partitioning of the current video unit is disabled when the first partitioning scheme is an XT partitioning scheme that is different from binary tree (BT), ternary tree (TT), or quadtree (QT) partitioning.

Optionally, in any of the preceding aspects, another implementation of the aspect provides that an indication of the further partitioning being disabled is omitted from the bitstream.

Optionally, in any of the preceding aspects, another implementation of the aspect provides that the current video unit is treated as a leaf node.

Optionally, in any of the preceding aspects, another implementation of the aspect provides that a depth to which the current video unit is further partitioned is based on a parent depth of the parent video unit due to the current video unit being obtained from the parent video unit by the first partitioning scheme, and wherein the first partitioning scheme is an XT partitioning scheme that is a different partitioning scheme than binary tree (BT), ternary tree (TT), or quadtree (QT) partitioning.

Optionally, in any of the preceding aspects, another implementation of the aspect provides that the XT partitioning scheme is an unsymmetrical binary partitioning (UBT), an unsymmetrical quadtree partitioning (UQT), an extended quadtree (EQT), or an extended ternary tree (ETT) partitioning scheme.

Optionally, in any of the preceding aspects, another implementation of the aspect provides that the current video unit is further partitioned using a partitioning scheme comprising quadtree (QT), binary tree (BT), ternary tree (TT), extended tree (ET), or multi-type tree (MTT) partitioning.

Optionally, in any of the preceding aspects, another implementation of the aspect provides that the rule specifies that the depth for at least some of QT, BT, TT, ET or MTT are different from each other.

Optionally, in any of the preceding aspects, another implementation of the aspect provides that whether or how to apply an XT partitioning scheme depends on a coding condition of the current video unit, wherein the XT partitioning scheme is different than quadtree (QT) or binary tree (BT) or ternary tree (TT).

Optionally, in any of the preceding aspects, another implementation of the aspect provides that the coding condition comprises a width W, a height H, or a partitioning depth of the video block.

Optionally, in any of the preceding aspects, another implementation of the aspect provides that the XT partitioning is disallowed for the current video unit when a resulting child block would cross more than one virtual pipeline data units (VPDUs).

Optionally, in any of the preceding aspects, another implementation of the aspect provides that the XT partitioning is disallowed for certain values of the width W or the height H.

Optionally, in any of the preceding aspects, another implementation of the aspect provides that the XT partitioning is disallowed for certain values of the depth.

Optionally, in any of the preceding aspects, another implementation of the aspect provides that the coding condition comprises coding information associated with a sequence, a temporal layer, a picture, a slice, or a block that includes the current video unit.

Optionally, in any of the preceding aspects, another implementation of the aspect provides that the coding condition comprises a color format of the video or a color component of the current video unit.

Optionally, in any of the preceding aspects, another implementation of the aspect provides that the coding condition comprises a type of the slice or a position of the current video unit within the picture.

Optionally, in any of the preceding aspects, another implementation of the aspect provides that whether a vertical or a horizontal type of the XT partitioning scheme is allowed is based on the position of the current video unit within the picture.

Optionally, in any of the preceding aspects, another implementation of the aspect provides that the XT partitioning scheme is disabled when the temporal layer is larger than a threshold value.

Optionally, in any of the preceding aspects, another implementation of the aspect provides that the conversion includes generating the video media data from the bitstream or generating the bitstream from the video media data.

A second aspect provides a non-transitory computer readable medium comprising a computer program product for use by a video coding device, the computer program product comprising computer executable instructions stored on the non-transitory computer readable medium such that when executed by a processor cause the video coding device to perform any of the preceding aspects.

A third aspect provides an apparatus for processing video data comprising: a processor; and a non-transitory memory with instructions thereon, wherein the instructions upon execution by the processor, cause the processor to perform any of the preceding aspects.

A fourth aspect provides a non-transitory computer-readable of any of the preceding claims, the non-transitory computer readable medium recording medium storing a bitstream of a video which is generated by a method performed by a video processing apparatus, wherein the method comprises applying a first partitioning scheme to a parent video unit to obtain a current video unit; and generating the bitstream based on application of the first partitioning scheme according to any of the preceding aspects.

A fifth aspect provides a method of any of the preceding claims for storing bitstream of a video, comprising applying a first partitioning scheme to a parent video unit to obtain a current video unit; generating the bitstream based on application of the first partitioning scheme; and storing the bitstream in non-transitory computer readable recording medium according to any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 18 is a flowchart of another exemplary method of video processing.

FIG. 19 is a flowchart of another exemplary method of video processing.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also. In the present document, editing changes are shown to the text by bold italics indicating cancelled text and bold under-line indicating added text, with respect to the VVC specification or International Organization for Standardization (ISO) base media file format (IS OB MFF) file format specification.

This document is related to image/video coding, and more particularly to transforms on some special kinds of blocks. The disclosed mechanisms may be applied to the video coding standards such as High Efficiency Video Coding (HEVC) and/or Versatile Video Coding (VVC). Such mechanisms may also be applicable to other video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
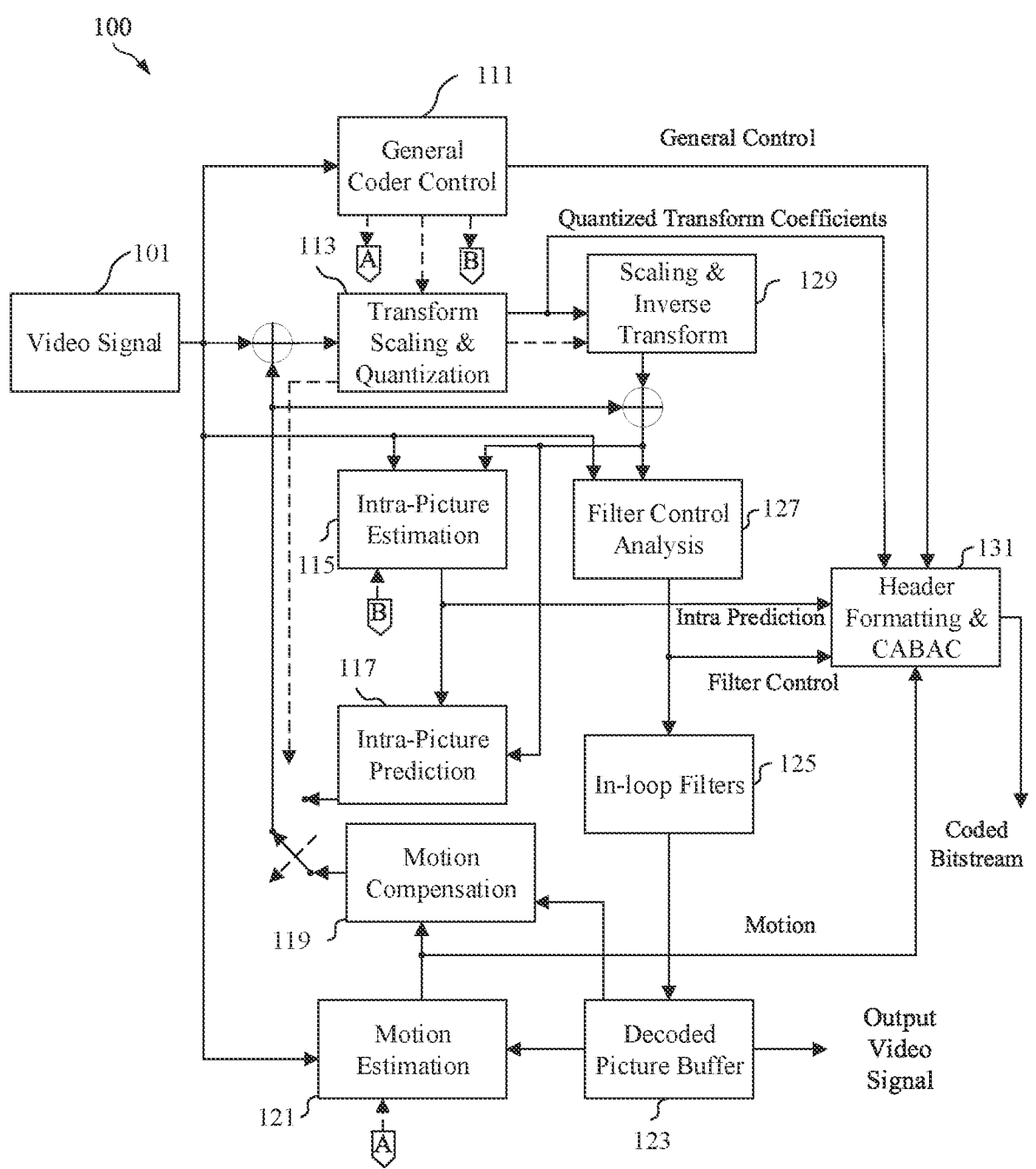
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and CABAC component 131 to be encoded in the bitstream to signal parameters for decoding at the decoder.

The video signal 101 is also sent to the motion estimation component 121 and the motion compensation component 119 for inter-prediction. A video unit (e.g., a picture, a slice, a CTU, etc.) of the video signal 101 may be divided into multiple blocks. Motion estimation component 121 and the motion compensation component 119 perform inter-predictive coding of the received video block relative to one or more blocks in one or more reference pictures to provide temporal prediction. Codec 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into coding blocks (CBs) for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, video codec 100 may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter-prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a sample adaptive filter (SAO) filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of the most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figures 2, 3:
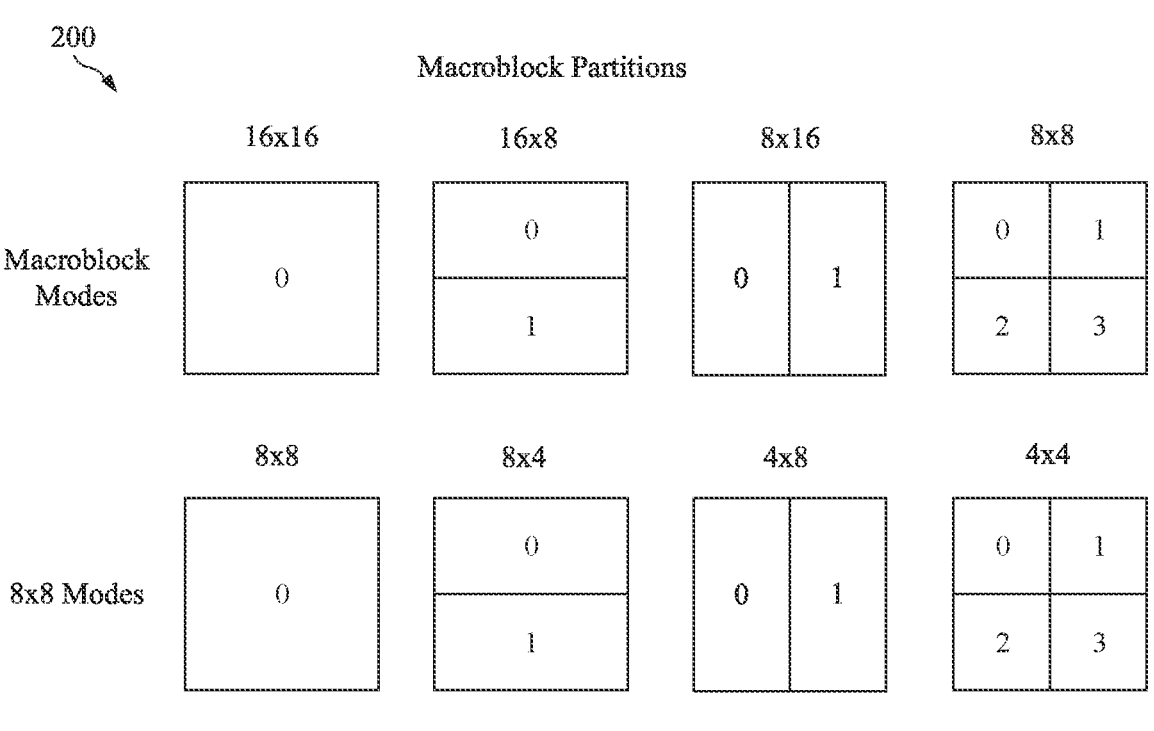
FIG. 2 is a schematic diagram of example macroblock partitions.
FIG. 3 is a schematic diagram of example modes for partitioning coding blocks, for example according to High Efficiency Video Coding (HEVC).

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A Sample is a luma (light) value or chroma (color) value at a pixel.

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, a M/2×M block, a M×M/2 block, a M/2×M/2 block, a M/4×M (left) block, a M/4×M (right) block, a M×M/4 (up) block, and/or a M×M/4 (down) block. It should be noted that the modes 300 for splitting CBs into PBs are subject to size constraints. Further, only M×M and M/2×M/2 are supported for intra picture predicted CBs.

Figures 4, 5:
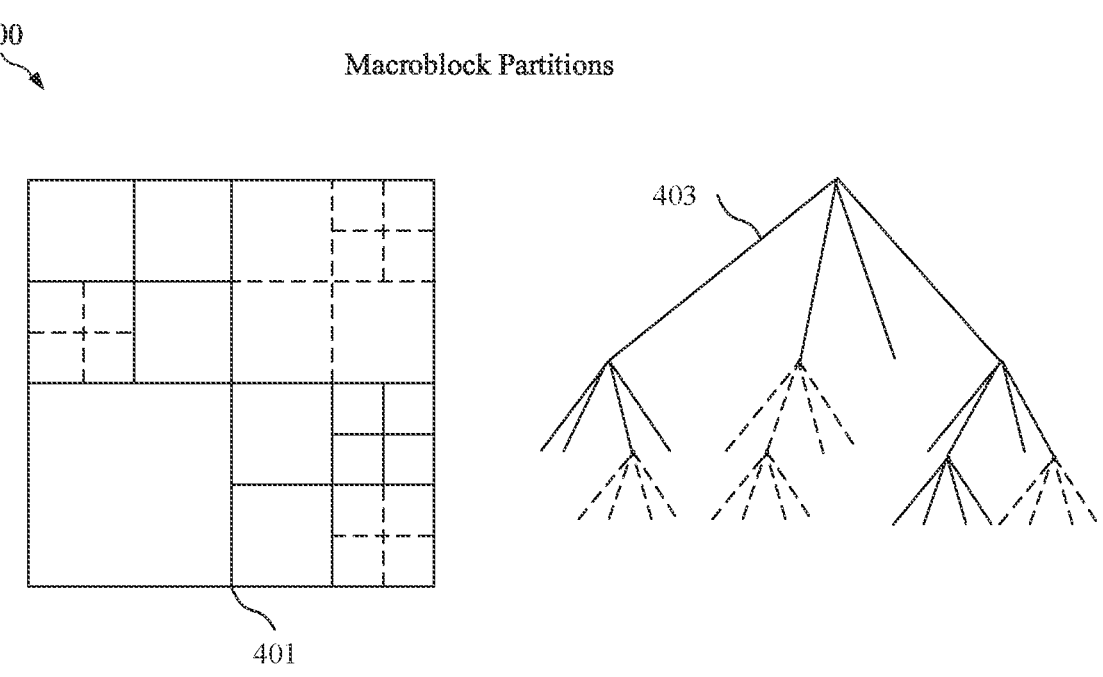
FIG. 4 is a schematic diagram example method for partitioning a picture for coding residual.
FIG. 5 is a schematic diagram example method for partitioning a picture, for example according to a quad tree binary tree (QTBT) structure.

FIG. 4 is a schematic diagram of an example method 400 for partitioning a picture for coding residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TBs. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts Group (VCEG) and MPEG to explore video coding technologies beyond HEVC. JVET has adopted many improvements and included such improvements into a reference software named Joint Exploration Model (JEM).

FIG. 5 is a schematic diagram of an example method 500 for partitioning a picture, for example according to a quad tree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In the JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quad tree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has a width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signalled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma CTBs to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figures 6, 7:
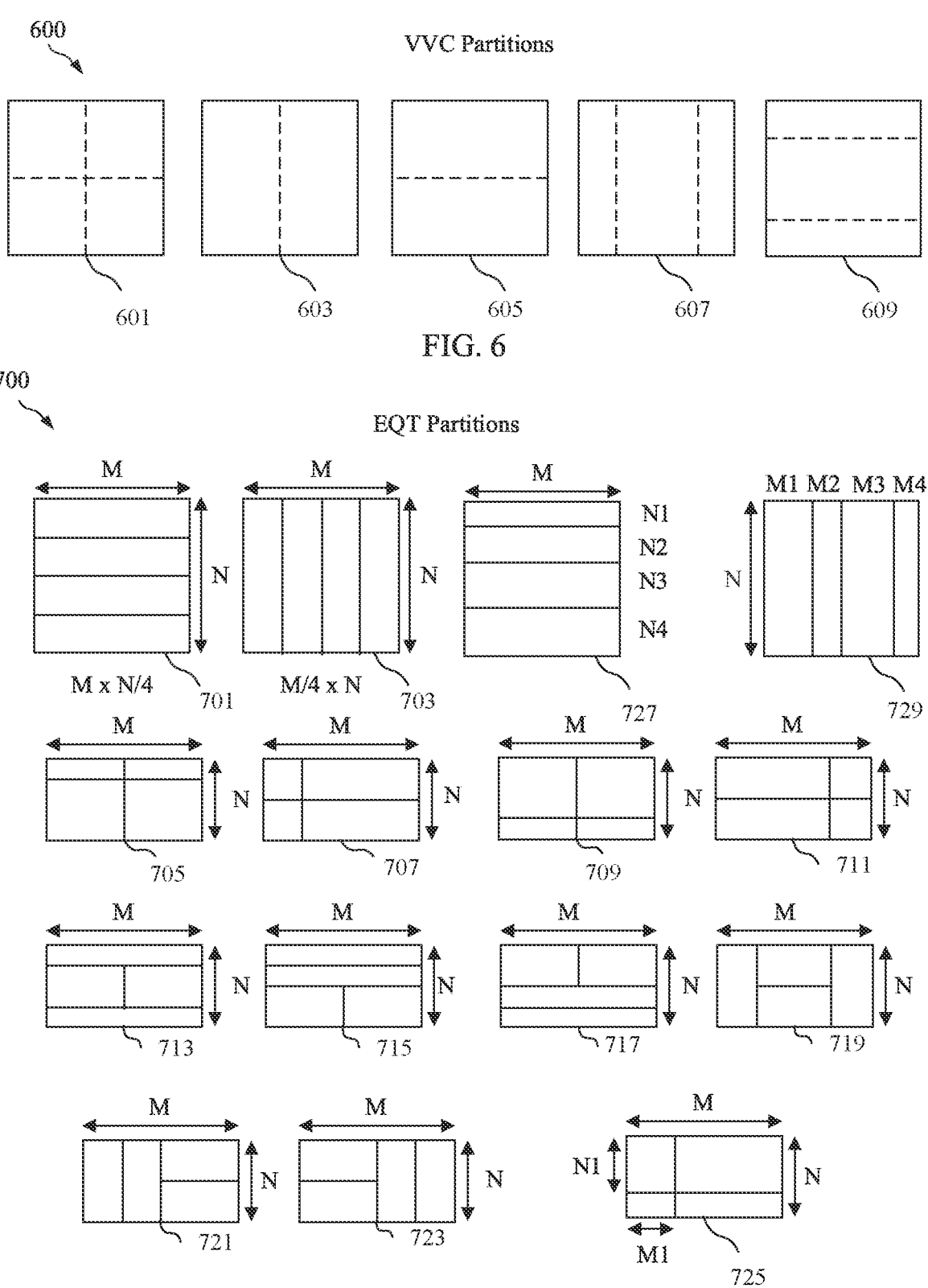
FIG. 6 is a schematic diagram of example partitioning structures used in Versatile Video Coding (VVC).
FIG. 7 is a schematic diagram example extended quad tree (EQT) partitioning structures.

Triple-tree partitioning for VVC is now discussed. FIG. 6 is a schematic diagram 600 of example partitioning structures used in VVC. As shown, split types other than quadtree and binary-tree are supported in VVC. For example, schematic diagram 600 includes a quad tree partition 601, a vertical binary tree partition 603, a horizontal binary tree partition 605, a vertical triple tree partition 607, and a horizontal triple tree partition 609. This approach introduces two triple tree (TT) partitions in addition to the quad tree and binary trees.

In an example implementation, two levels of trees are employed including a region tree (a quad-tree) and a prediction tree (binary-tree or triple-tree). A CTU is first partitioned by a region tree (RT). A RT leaf may be further split with prediction tree (PT). A PT leaf may also be further split with PT until a max PT depth is reached. A PT leaf is a basic coding unit. The PT may also be called a CU for convenience. In an example implementation, a CU cannot be further split. Prediction and transform are both applied on CU in the same way as JEM. The whole partition structure is named multiple-type-tree.

An extended quad tree is now discussed. FIG. 7 is a schematic diagram 700 of example EQT partitioning structures. An EQT partitioning structure corresponding to a block partitioning process includes an extended quad tree partitioning process for the block of video data. The extended quad partitioning structure represents partitioning the block of video data into final sub-blocks. When the extended quad tree partitioning process decides to apply an extended quad tree partition to a block, the block is always split into four sub-blocks. Decoding of the final sub-blocks is based on the video bitstream. Decoding of the block of video data is based on the final sub-blocks decoded according to the EQT structure derived.

The EQT partitioning process can be applied to a block recursively to generate EQT leaf nodes. Alternatively, when EQT is applied to a certain block, for each of the sub-blocks resulting from the EQT split may further be split into BT and/or QT and/or TT and/or EQT and/or other kinds of partition trees. In one example, EQT and QT may share the same depth increment process and the same restrictions of leaf node sizes. In this case, the partitioning of one node can be implicitly terminated when the size of the node reaches a minimum allowed quad tree leaf node size or EQT depth with the node reaches a maximum allowed quad tree depth. Alternatively, EQT and QT may share different depth increment processes and/or restrictions of leaf node sizes. The partitioning of one node by EQT may be implicitly terminated when the size of the node reaches a minimum allowed EQT leaf node size or the EQT depth associated with the node reaches a maximum allowed EQT depth. In one example, the EQT depth and/or the minimum allowed EQT leaf node sizes may be signaled in a sequences parameter set (SPS), a picture parameter set (PPS), a slice header, a CTU, a region, a tile, and/or a CU.

EQT may not use a quad tree partition applied to a square block, for example where the block has a size of M×N where M and N are equal or unequal non-zero positive integer values. Instead, EQT splits one block equally into four partitions, such as an M/4×N split 703 or an M×N/4 split 701. Split 727 and split 729 show general examples of split 701 and 703, respectively. For example, split 727 is split into M×N1, M×N2, M×N3, and M×N4, where N1+N2+N3+N4=N. Further, split 729 is split into M1×N, M2×N, M3×N and M4×N where M1+M2+M3+M4=M.

In another example, the EQT can split the shape equally into four partitions where the partition size is dependent on the maximum and minimum values of M and N. In one example, one 4×32 block may be split into four 4×8 sub-blocks while a 32×4 block may be split into four 8×4 sub-blocks.

In another example, EQT splits one block equally into four partitions, such as two partitions are with size equal to (M*w0/w)×(N*h0/h) and the other two are with (M*(w−w0)/w)×(N*(h−h0)/h) as shown by split 705, split 707, split 709, and split 711. For example, w0 and w may be equal to 1 and 2, respectively, such that the width is reduced by half while the height can use other ratios instead of 2:1 to get the sub-blocks. In another example, h0 and h may be equal to 1 and 2, respectively, such that the height is reduced by half while the width can use other ratios instead of 2:1. For example, split 705 includes a sub-block width fixed to be M/2 with a height equal to N/4 or 3N/4 with a smaller selection for the top two partitions. For example, split 707 includes a sub-block height fixed to be N/2 with a width equal to M/4 or 3M/4 with a smaller selection for the left two partitions. For example, split 709 includes a sub-block width fixed to be M/2 with a height equal to N/4 or 3N/4 with a smaller selection for the bottom two partitions. For example, split 711 includes a sub-block height fixed to be N/2 with a width equal to M/4 or 3M/4 with a smaller selection for the right two partitions.

Split 713, split 715, split 717, split 719, split 721, and split 723 show other examples of quad tree partitioning. For example, split 713, split 715, and split 717 show options where the shape is split by M×N/4 and M/2×N/2. For example, split 719, split 721, and split 723 show options where the shape is split by N×M/4 and N/2×M/2.

Split 725 shows a more general case of quad tree partitioning with different shapes of partitions. In this case, split 725 is split such that M1×N1, (M−M1)×N1, M1×(N−N1) and (M−M1)×(N−N1).

Figure 8:
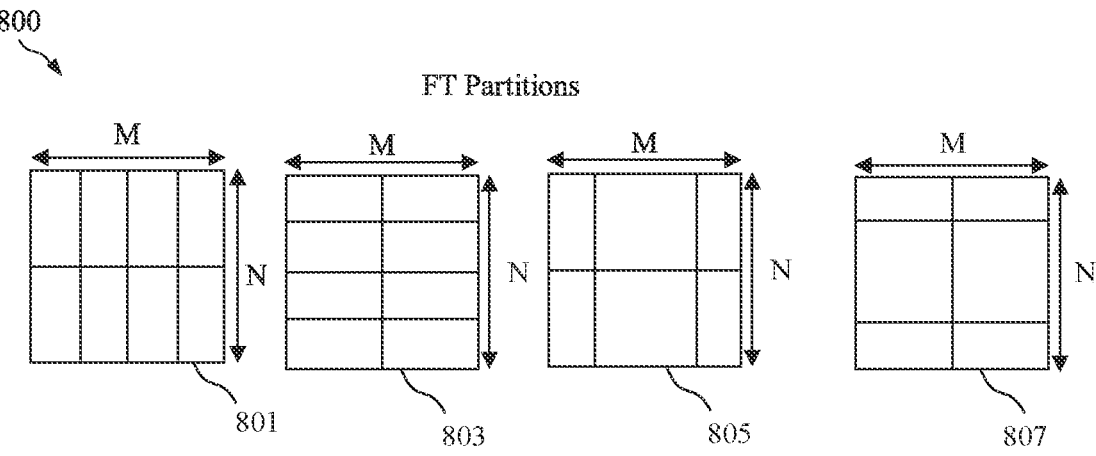
FIG. 8 is a schematic diagram of example flexible tree (FT) partitioning structures.

FIG. 8 is a schematic diagram 800 of example flexible tree (FT) partitioning structures. A FT partitioning structure corresponds to a block partitioning process including an FT partitioning process for the block of video data. The FT partitioning structure represents a partitioning for a block of video data into final sub-blocks. When the FT partitioning process decides to apply a FT partition to a block, the block is split into K sub-blocks wherein K could be larger than 4. The final sub-blocks can be coded based on the video bitstream. Further, the block of video data can be decoded based on the final sub-blocks decoded according to the FT structure derived. The FT partitioning process can be applied to a given block recursively to generate FT tree leaf nodes. The partitioning of one node is implicitly terminated when the node reaches a minimum allowed FT leaf node size or FT depth associated with the node reaches a maximum allowed FT depth. Further, when FT is applied to a certain block, multiple sub-blocks can be created. Each of the sub-blocks created by FT may further be split into BT, QT, EQT, TT, and/or other kinds of partition trees. In an example, the FT depth or the minimum allowed FT leaf node sizes or the minimum allowed partition size for FT may be signaled in a SPS, a PPS, a slice header, a CTU, a region, a tile, and/or a CU. Similar to EQT, all of the sub-blocks created by FT partitions may be the same or different sizes.

Schematic diagram 800 includes example FT partitioning structures where the number of sub-blocks, denoted as K, is set equal to six or eight. Split 801 is a partitioning structure with K=8, M/4*N/2. Split 803 is a partitioning structure with K=8, M/2*N/4. Split 805 is a partitioning structure with K=6, M/2*N/2 and M/4*N/2. Split 807 is a partitioning structure with K=6, M/2*N/2 and M/2*N/4.

Figure 9:
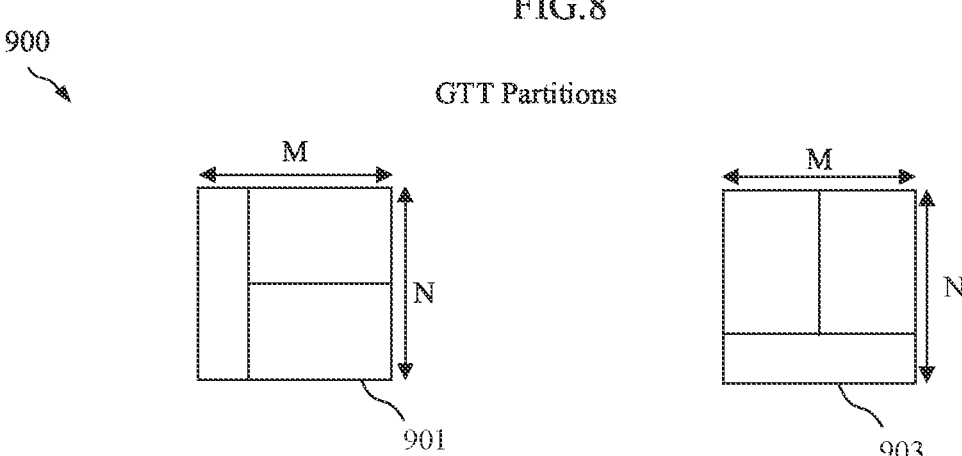
FIG. 9 is a schematic diagram of example generalized TT (GTT) partitioning structures.

FIG. 9 is a schematic diagram 900 of example generalized TT (GTT) partitioning structures. For the TT partitioning structure, the restriction of splitting along either horizontal or vertical may be removed. The GTT partition pattern may be defined as splitting for both horizontal and vertical. Split 901 employs a left split from a vertical TT split and a horizontal BT split of the remaining area. Split 903 employs a bottom split from a horizontal TT split and a vertical BT split of the remaining area. In some examples, the partitioning EQT, FT, and/or GTT partitioning methods may be applied under certain conditions. In other words, when the condition(s) are not satisfied, there is no need to signal the partition types. In another example, the EQT, FT, and/or GTT partitioning methods may be used to replace other partition tree types. In another example, the EQT, FT, and/or GTT partitioning methods may be only used as a replacement for other partition tree types under certain conditions. In one example, the condition may be based on the picture, slice types, block sizes, the coded modes, and/or whether a block is located at a picture, slice, and/or tile boundary. In one example, EQT may be treated in the same way as QT. In this case, when the QT partition tree type is selected, more flags/indications of the detailed quad-tree partition patterns may be further signaled. In some examples, EQT may be treated as additional partition patterns. In one example, the signaling of partitioning methods of EQT, FT, and/or GTT may be conditional. For example, one or more EQP, FT, and/or GTT partitioning methods may not be used in some cases, and the bits corresponding to signal these partitioning methods are not signaled.

Figure 10:
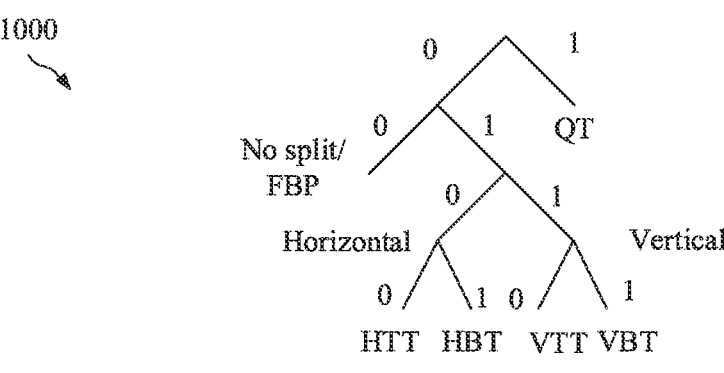
FIG. 10 is a schematic diagram example boundary partitioning tree.

FIG. 10 is a schematic diagram of an example boundary partitioning tree 1000, which is also known as a versatile boundary partition. The boundary partitioning tree 1000 is an example boundary handling method for VVC and/or Audio and Video Coding Standard Workgroup Part three (AVS-3.0). Since the forced quadtree boundary partition solution in VVC is not optimized, the boundary partitioning tree 1000 uses regular block partition syntax to maintain continuity with the CABAC engine as well as to match the picture boundary. The versatile boundary partition obtains the following rules (both encoder and decoder). Since the boundary partitioning tree 1000 uses exactly the same partition syntax of the normal block (non-boundary) for boundaries located at block, the syntax is not changed. If the no split mode is parsed for the boundary CU, the forced boundary partition (FBP) is used to match the picture boundary. After the forced boundary partition is used (non-singling boundary partition), no further partition is performed. The forced boundary partition is described as follows. If the size of the block is larger than the maximal allowed BT size, forced QT is used to perform the FBP in the current forced partition level. Otherwise, if the bottom-right sample of current CU is located below the bottom picture boundary and not extended to the right boundary, a forced horizontal BT is used to perform the FBP in the current forced partition level. Otherwise, if the bottom-right sample of current CU is located at the right side of the right picture boundary and not below the bottom boundary, a forced vertical BT is used to perform the FBP in the current forced partition level. Otherwise, if the bottom-right sample of current CU is located at the right side of the right picture boundary and below the bottom boundary, a forced QT is used to perform the FBP in the current forced partition level.

Figures 11, 12:
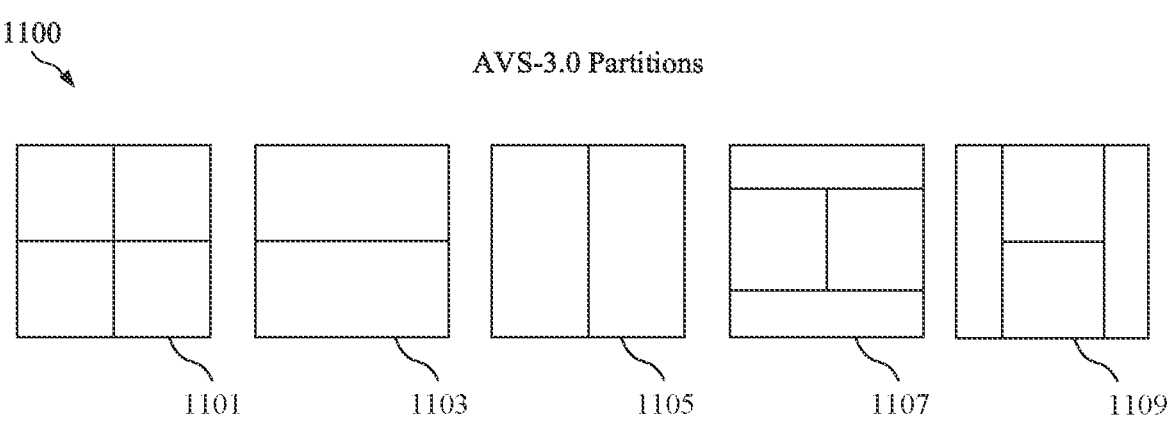
FIG. 11 is a schematic diagram of example partitioning structures used in Audio and Video Coding Standard (AVS) part three (AVS-3.0).
FIG. 12 is a schematic diagram of example Unsymmetrical Quad-Tree (UQT) partitioning structures.

FIG. 11 is a schematic diagram 1100 of example partitioning structures used in Audio and Video Coding Standard (AVS) part three (AVS-3.0). Partitioning in AVS-3.0 is now discussed. The Audio and Video Coding Standard (AVS) Workgroup of China was authorized to be established by the Science and Technology Department under the former Ministry of Industry and Information Technology of People's Republic of China. With the mandate of satisfying the demands from the rapidly growing information industry, AVS is committed to producing technical standards of high quality for compression, decompression, processing, and representation of digital audio and video, and thus providing digital audio-video equipment and systems with high-efficient and economical coding/decoding technologies. AVS can be applied in wide variety of significant information sectors including high-resolution digital broadcast, high-density laser-digital storage media, wireless broad-band multimedia communication and internet broad-band stream media. AVS is one of the second generation of source coding/decoding standards and owns independent Chinese intellectual property rights. Source coding technology primarily addresses the problem of coding and compressing audio and video mass data from initial data and original sources. Hence AVS is known as digital video and audio coding technology, and is the premise of the subsequent digital transmission, storage, and broadcast. Further, AVS serves as a common standard for the digital video and audio industry.

AVS-3.0 employs a QT partitioning 1101, a vertical BT partitioning 1105, a horizontal BT partitioning 1103, and a horizontal extended quad-tree (EQT) partitioning 1107, and a vertical EQT partitioning 1109 to split a largest coding unit (LCU) into multiple CUs. QT partitioning, BT partitioning, and EQT partitioning can all be used for the root, internal nodes, or leaf nodes of the partitioning tree. However, QT partitioning is forbidden after any BT and/or EQT partitioning.

FIG. 12 is a schematic diagram 1200 of example Unsymmetrical Quad-Tree (UQT) partitioning structures. UQT partitioning employs a block with dimensions W×H, which is split into four partitions with dimensions W1×H1, W2×H2, W3×H3 and W4×H4, where W1, W2, W3, W4, H1, H2, H3, H4 are all integers. In one example, at least one of the partitions has a different block size compared to others. In one example, only two of the four partitions may have equal size, and the other two are different with each other and different from the two partitions with equal size. In one example, all the parameters are in the form of power of 2. For example, W1=2N1, W2=2N2, W3=2N3, W4=2N4, H1=2M1, H2=2M2, H3=2M3, H4=2M4. In one example, UQT only splits one partition in a vertical direction, for example, H1=H2=H3=H4=H. In one example, in split 1201 W1=W/8, W2=W/2, W3=W/8, W4=W/4, H1=H2=H3=H4=H. This kind of UQT is vertical split and named as UQT1-V. In one example, in split 1203 W1=W/8, W2=W/2, W3=W/4, W4=W/8, H1=H2=H3=H4=H. This kind of UQT is vertical split and named as UQT2-V. In one example in split 1205 W1=W/4, W2=W/8, W3=W/3, W4=W/8, H1=H2=H3=H4=H. This kind of UQT is vertical split and named as UQT3-V. In one example, in split 1207 W1=W/8, W2=W/4, W3=W/2, W4=W/8, H1=H2=H3=H4=H. This kind of UQT is vertical split and named as UQT4-V.

In one example, UQT only splits one partition in a horizontal direction, for example, W1=W2=W3=W4=W. In one example, in split 1209 H1=H/8, H2=H/2, H3=H/8, H4=H/4, W1=W2=W3=W4=W. This kind of UQT is horizontal split and named as UQT1-H. In one example, in split 1211 H1=H/8, H2=H/2, H3=H/4, H4=H/8, W1=W2=W3=W4=W. This kind of UQT is horizontal split and named as UQT2-H. In one example, in split 1213 H1=H/4, H2=H/8, H3=H/2, H4=H/8, W1=W2=W3=W4=W. This kind of UQT is horizontal split and named as UQT3-H. In one example, in split 1215

H1=H/8, H2=H/4, H3=H/2, H4=H/8, W1=W2=W3=W4=W. This kind of UQT is horizontal split and named as UQT4-H.

Figure 13:
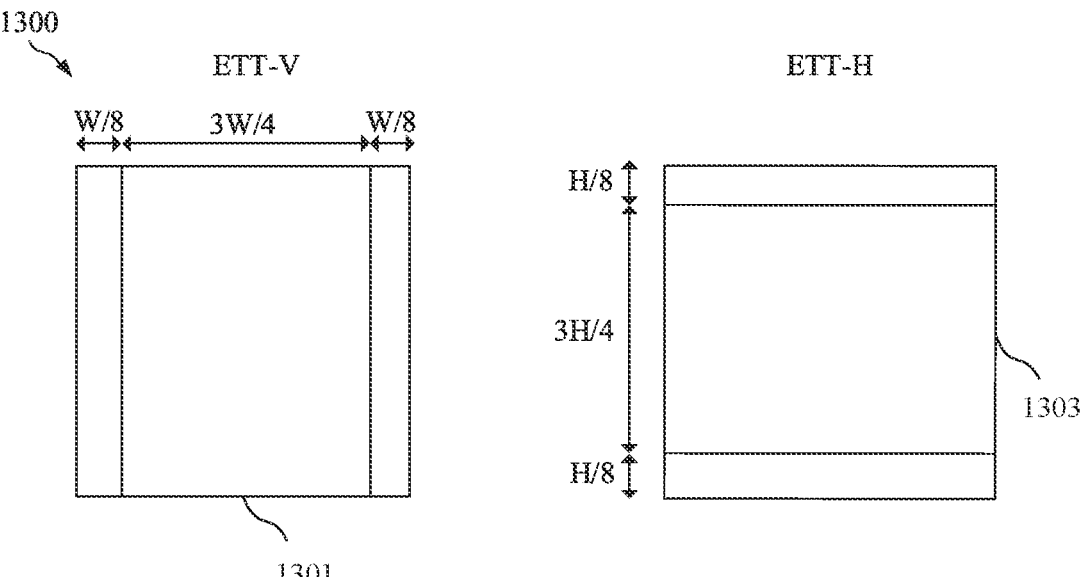
FIG. 13 is a schematic diagram of example Extended Ternary-Tree (ETT) partitioning structures.

FIG. 13 is a schematic diagram 1300 of example ETT partitioning structures, including an ETT-V split 1301 and an ETT-H split 1303. When employing ETT, a block with dimensions width times height (W×H) is split into three partitions with dimensions W1×H1, W2×H2, and W3×H3. W1, W2, W3, H1, H2, H3 are all integers. In an example, and at least one of the parameters is not in the form of power of 2. W1, W2, and W3 are widths of resulting sub-blocks. H1, H2, and H3 are heights of resulting sub-blocks. In one example, W2 cannot be in a form of W2=2N2 with any positive integer N2. In another example, H2 cannot be in a form of H2=2 N2 with any positive integer N2. In one example, at least one of the parameters is in the form of power of 2. In one example, W1 is in a form of W1=$2^{N1}$ with a positive integer N1. In another example, H1 is in a form of H1=$2^{N1}$ with a positive integer N1.

In one example, ETT only splits one partition in a vertical direction, for example where W1=a1*W, W2=a2*W, and W3=a3*W, where a1+a2+a3=1, and where H1=H2=H3=H. This kind of ETT is a vertical split and may be referred to as ETT-V. In one example, ETT-V split 1301 can be used where W1=W/8, W2=3*W/4, W3=W/8, and H1=H2=H3=H. In one example, ETT only splits one partition in horizontal direction, for example where H1=a1*H, H2=a2*H, and H3=a3*H, where a1+a2+a3=1, and where W1=W2=W3=W. This kind of ETT is a horizontal split and may be referred to as ETT-H. In one example, ETT-H split 1303 can be used where H1=H/8, H2=3*H/4, H3=H/8, and W1=W2=W3=W.

Figure 14:
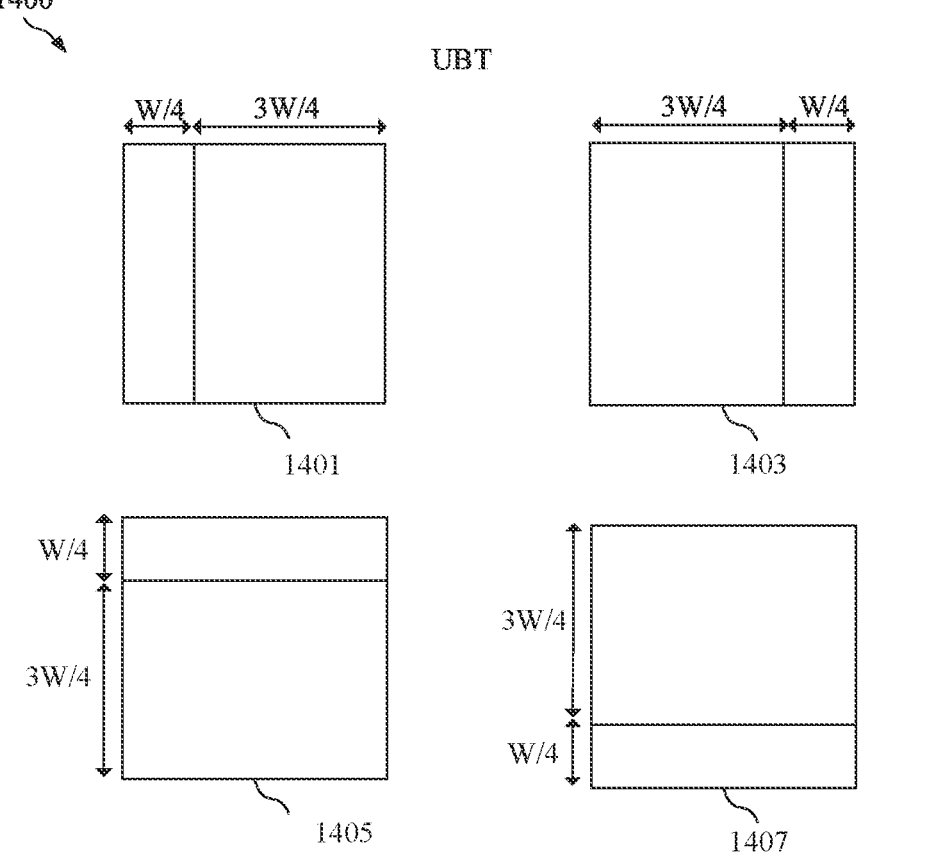
FIG. 14 is a schematic diagram of example 1/4 Unsymmetric Binary Tree (UBT) partitioning structures.

FIG. 14 is a schematic diagram 1400 of example 1/4 UBT partitioning structures, which includes vertical UBT (UBT-V) partitions and horizontal UBT (UBT-H) partitions. A block of dimensions W×H can be split into two sub-blocks dimensions W1×H1 and W2×H2, where one of the sub-blocks is a dyadic block and the other is a non-dyadic block. Such a split is named as Unsymmetric Binary Tree (UBT) split. In one example, W1=a×W, W2=(1−a)×W, and H1=H2=H. In such as case, the partition may be called a vertical UBT (UBT-V). In one example, a may be smaller than 1/2, such as 1/4, 1/8, 1/16, 1/32, 1/64, etc. In such a case, the partition may be called a Type 0 UBT-V, an example of which is shown as split 1401. In one example, a may be larger than 1/2, such as 3/4, 7/8, 15/16, 31/32, 63/64, etc. In such a case, the partition is called a Type 1 UBT-V, an example of which is shown as split 1403. In one example, H1=a×H, H2=(1−a)×H, W1=W2=W. In such a case, the partition may be called a horizontal UBT (UBT-H). In one example, a may be smaller than 1/2, such as 1/4, 1/8, 1/16, 1/32, 1/64, etc. In such a case, the partition is called a Type 0 UBT-H, an example of which is shown as split 1405. In one example, a may be larger than 1/2, such as 3/4, 7/8, 15/16, 31/32, 63/64, etc. In such a case, the partition may be called a Type 1 UBT-H, an example of which is shown as split 1407.

The following are example technical problems solved by the disclosed technical solutions. The present disclosure provides mechanisms to address one or more of the problems listed above including that with the new proposed partitioning method, there may be too many combinations to be tested. Disclosed herein are systems and methods for specifying the interaction of multiple partitioning techniques. The methods result in achieving better coding performance. These methods may be applied to existing video coding standards such as HEVC or VVC or may be applicable to future video coding standards or video codec. As used here in a video unit may refer to any data or unit of video data, such as but not limited to a block or blocks of video data.

Disclosed herein are systems and method for determining the interaction of multiple partitioning schemes by determining a partitioning scheme used on currently partitioned video units of video media data and the allowed or disallowed subsequent partitioning schemes that may be used for further partitioning of the video unit. For example, the current video unit may be partitioned a second time using a second partitioning scheme when either or both the first partitioning scheme or the second partitioning scheme is an XT partitioning scheme. An XT partitioning scheme may refer to a particular one or more types of partitioning schemes. XT partitioning may further refer to any type of known partitioning scheme but exclude certain types of partitioning. For example, in one embodiment, the XT partitioning scheme may include any type of partitioning scheme except binary tree (BT), ternary tree (TT), or quadtree (QT) partitioning.

In one embodiment, the present disclosure applies a first partitioning scheme to a parent video unit to obtain a current video unit and performs a conversion between a video media data and a bitstream based on application of the first partitioning scheme. For example. the current video unit may then be partitioned using a second partitioning scheme where at most one of the first partitioning scheme or the second partitioning scheme is an XT partitioning scheme that is different from binary tree (BT), ternary tree (TT), or quadtree (QT) partitioning. The present disclosure may then perform the conversion between a video media data and a bitstream accordingly.

In other embodiments, where the first partitioning scheme used to obtain the current video unit from a parent video unit is an XT partitioning scheme that is different from binary tree (BT), ternary tree (TT), further partitioning of the current video unit is disabled.

In still other embodiments, based on the first partitioning scheme a depth to which the current video unit is further partitioned is based on a parent depth of a parent video unit due to the current video unit being obtained from the parent video unit by the first partitioning scheme, again where the first partitioning scheme is an XT partitioning scheme that is a different partitioning scheme than (BT), ternary tree (TT), or quadtree (QT) partitioning.

Other rules for determining the interaction of multiple partitioning schemes will readily suggest themselves to those skilled in the art based on the present disclosure.

The detailed embodiments below should be considered as examples to explain general concepts. These embodiments should not be interpreted in a narrow way. Furthermore, these embodiments can be combined in any manner. In the following discussion, QT, BT, TT, EQT, UQT, and ETT may refer to QT split, BT split, TT split, EQT split, UQT split and ETT split, respectively. In the following discussion, a block is a dyadic block if both width and height is a dyadic number, which is in a form of a $2^N$ with N being a positive integer. In the following discussion, a block is a non-dyadic block if at least one of width and height is a non-dyadic number, which cannot be represented in a form of a $2^N$ with N being a positive integer. In the following discussion, split and partitioning have the same meaning. In the following discussion, "XT" may be UBT or ETT or EQT or other kinds of split methods excluding the existing QT/BT/TT.

Example 1

XT may be used together with other kinds of partitioning methods, i.e., a block split from a first partition may be further split by a second partition and at least one of the first or second partition is XT.

A block which is split into child blocks by XT, may be split from a parent block by QT or BT or TT or ETT, or UQT or UBT or EQT.

A block which may allow XT partitions, may be a block generated by QT or BT or TT or ETT, or UQT or UBT partitions.

For example, the maximum block that allows XT partitions, may be the largest coding block (coding tree block or coding tree unit).

For example, the maximum block that allows XT partitions, may be the virtual pipeline data unit (VPDU).

For example, a block which allows XT partitions may be split from a parent block by one or more or some specific kinds of split methods.

For example, a block which is split into child blocks by XT, can only be split from a parent block by QT.

In one example, the maximum/minimum block size that could allow XT partitions and/or the maximum split depth that could allow XT partitions may be signalled in SPS/PPS/VPS/APS/sequence header/picture header/slice header/tile group header/CTU row/regions, etc.

In one example, the maximum/minimum block size that could allow XT partitions and/or the maximum split depth that could allow XT partitions may be dependent on a profile/level/tier of a standard.

In one example, the maximum/minimum block size that could allow XT partitions and/or the maximum split depth that could allow XT partitions may be derived, such as to be the same as that allow QT partitions.

A block which is split from a parent block by XT, may be further split into child blocks by QT and/or BT and/or TT and/or UQT and/or UBT and/or ETT and/or EQT.

For example, a block which is split from a parent block by XT, may be further split into child blocks by BT.

For example, a block which is split from a parent block by XT, may be further split into child blocks by TT.

For example, a block which is split from a parent block by XT, may be further split into child blocks by UBT.

For example, a block which is split from a parent block by XT, may be further split into child blocks by ETT.

For example, a block which is split from a parent block by XT, may be further split into child blocks by XT and/or QT.

For example, a block which is split from a parent block by XT, is not allowed to be further split into child blocks by QT.

For example, a block which is split from a parent block by XT, may be further split into child blocks by EQT.

Example 2

XT may be disallowed to work together with other kinds of partitioning methods, i.e., a block split from a first partition may be disallowed to further split by a second partition and at least one of the first or second partition is XT.

In one example, a block which is split from a parent block by XT, may be disallowed to be further split into child blocks by QT and/or EQT.

In one example, a block which is split from a parent block by XT, may be disallowed to be further split into child blocks by BT and/or UBT.

In one example, a block which is split from a parent block by XT, may be disallowed to be further split into child blocks by TT and/or ETT.

For example, a block which is split from a parent block by XT, is disallowed to be further split into child blocks by XT.

Example 3

A block which is split from a parent block by XT, is disallowed to be further split into any child blocks.

Alternatively, furthermore, the indication of split methods is not signalled for the block anymore.

Alternatively, furthermore, the block is treated as a leaf node.

Example 4

When a parent block is split into child blocks by XT, the split depth of the child block may be derived from the split depth of the parent block.

In one example, the splitting due to XT may be used to update the QT/BT/TT/XT/MTT depth.

In one example, the QT depth of one or all of the child blocks is equal to the QT depth of the parent block added by K (e.g., K=1).

In one example, the BT depth of one or all of the child blocks is equal to the BT depth of the parent block added by K (e.g., K=1).

In one example, the TT depth of one or all of the child blocks is equal to the TT depth of the parent block added by K (e.g., K=1).

In one example, the XT depth of one or all of the child blocks is equal to the XT depth of the parent block added by K (e.g., K=1).

In one example, the MTT depth of one or all of the child block is equal to the MTT depth of the parent block added by K (e.g., K=1).

For example, the MTT depth of the child block is equal to the MTT depth of the parent block added by K (e.g., K=1). if the parent block is split into child blocks by BT.

For example, the MTT depth of the child block is equal to the MTT depth of the parent block added by K (e.g., K=1). if the parent block is split into child blocks by TT.

In one example, the XT/BT/TT/QT/MTT depth increasement methods for different child blocks may be different.

The depth increasement is dependent on the ratio of a child block compared to the parent block.

The MTT depth of one or all of the child block is equal to the MTT depth of the parent block added by K, K>1. For example, K=2.

In one example, K may be different for different child blocks.

Example 5

Whether to and/or how to apply XT may depend on width/height/depth of the current block.

XT is not allowed if a split child block cross more than one Virtual pipeline data units (VPDUs).

XT is not allowed if the width/height of the current block satisfy some conditions. (Suppose the width and height of the current block are W and H, T1, T2 and T are integers), for example:

XT is not allowed if W>=T1 and H>=T2;

XT is not allowed if W>=T1 or H>=T2;

XT is not allowed if W<=T1 and H<=T2;

XT is not allowed if W<=T1 or H<=T2;

XT is not allowed if W×H<=T;

XT is not allowed if W×H>=T;

Horizontal XT is not allowed if H<=T; For example, T=16.

Horizontal XT is not allowed if H>=T; For example, T=128.

Vertical XT is not allowed if W<=T; For example, T=16.

Vertical XT is not allowed if W>=T; For example, T=128.

T1, T2 and T may be signaled from the encoder to the decoder in VPS/SPS/PPS/picture header/slice header/ tile group header/tile header.

T1, T2 and T may depend on color components. For example, T1, T2 and T may be different for luma and chroma components.

T1, T2 and T may depend on slice types. For example, T1, T2 and T may be different for I-slice and P-slice/B-slice.

T1, T2 and T may depend on whether luma coding tree and chroma coding tree are separated. For example, T1, T2 and T may be different for luma and chroma components if luma coding tree and chroma coding tree are separated.

Alternatively, when the transform is not supported for at least one child block due to XT splitting, XT split is not allowed.

Alternatively, when the depth of one block exceeding the allowed depth for XT splitting, XT split is not allowed.

Alternatively, when any of a child block size exceeding the allowed block size due to XT splitting, XT split is not allowed.

XT is allowed if the width/height of the current block satisfy some conditions. (Suppose the width and height of the current block are W and H, T1, T2 and T are integers), for example:

XT is allowed if W>=T1 and H>=T2;

XT is allowed if W>=T1 or H>=T2;

XT is allowed if W<=T1 and H<=T2;

XT is allowed if W<=T1 or H<=T2;

XT is allowed if W×H<=T;

XT is allowed if W×H>=T;

Horizontal XT is allowed if H<=T; For example, T=64.

Horizontal XT is allowed if H>=T; For example, T=32.

Vertical XT is allowed if W<=T; For example, T=64.

Vertical XT is allowed if W>=T; For example, T=32.

T1, T2 and T may be signaled from the encoder to the decoder in VPS/SPS/PPS/picture header/slice header/ tile group header/tile header.

T1, T2 and T may depend on color components. For example, T1, T2 and T may be different for luma and chroma components.

T1, T2 and T may depend on whether luma coding tree and chroma coding tree are separated. For example, T1, T2 and T may be different for luma and chroma components if luma coding tree and chroma coding tree are separated.

In one example, T1, T2 and T may depend on picture/slice types.

In one example, Horizontal XT is allowed if TP1<=H<=TP2 and/or Vertical XT is allowed if TP1<=W<=TP2 on a P-slice/P-picture or a B-slice/B-picture, and Horizontal XT is allowed if TB<=H<=TI2 and/or Vertical XT is allowed if TI1<=W<=TI2 on an I-slice/I-picture, then In one example, TP1 is larger than TH. For example, TI1=32, TP1=64, TI2=TP2=64.

In one example, TP2 is smaller than TI2. For example, TI2=64, TP2=32, TI1=TP1=32.

XT is not allowed if the depth of the current block satisfy some conditions. The depth of the current block may refer to QT depth, BT depth, TT depth, XT depth or MTT depth. For example:

XT is not allowed if the split depth<=T;

XT is not allowed if the split depth>=T;

XT is not allowed if the QT split depth<=T;

XT is not allowed if the QT split depth>=T;

XT is not allowed if the BT split depth>=T;

XT is not allowed if the BT split depth<=T;

XT is not allowed if the TT split depth>=T;

XT is not allowed if the TT split depth>=T;

XT is not allowed if the XT split depth<=T;

XT is not allowed if the XT split depth>=T;

XT is not allowed if the MTT split depth<=T;

XT is not allowed if the MTT split depth>=T;

T may be signaled from the encoder to the decoder in VPS/SPS/PPS/picture header/slice header/tile group header/tile header.

T may depend on color components. For example, T1, T2 and T may be different for luma and chroma components.

T may depend on slice types, For example, T1, T2 and T may be different for I-slice and P-slice/B-slice.

T may depend on whether luma coding tree and chroma coding tree are separated. For example, T1, T2 and T may be different for luma and chroma components if luma coding tree and chroma coding tree are separated.

XT is allowed if the depth of the current block satisfy some conditions. The depth of the current block may refer to QT depth, BT depth, TT depth, XT depth or MTT depth. For example:

XT is allowed if the split depth<=T;

XT is allowed if the split depth>=T;

XT is allowed if the QT split depth<=T;

XT is allowed if the QT split depth>=T;

XT is allowed if the BT split depth>=T;

XT is allowed if the BT split depth<=T;

XT is allowed if the TT split depth>=T;

XT is allowed if the TT split depth>=T;

XT is allowed if the XT split depth<=T;

XT is allowed if the XT split depth>=T;

XT is allowed if the MTT split depth<=T;

XT is allowed if the MTT split depth>=T;

T may be signaled from the encoder to the decoder in VPS/SPS/PPS/picture header/slice header/tile group header/tile header.

T may depend on color components. For example, T1, T2 and T may be different for luma and chroma components.

T may depend on slice types. For example, T1, T2 and T may be different for I-slice and P-slice/B-slice.

T may depend on whether luma coding tree and chroma coding tree are separated. For example, T1, T2 and T may be different for luma and chroma components if luma coding tree and chroma coding tree are separated.

Example 6

Whether and/or how to use XT may depend on coding information at different levels, such as sequence level, temporal layer level, picture level, slice level, block level, etc.

Whether and how to use XT may depend on color format (such as 4:4:4 or 4:2:0) and/or color components.

Whether and how to use XT may depend on whether luma and chroma coding trees are separated.

In one example, XT can only be applied on a luma component when the luma and the chroma coding trees are separated.

Whether to apply XT and/or which kind of XT is applied may be signaled from encoder to decoder.

In one example, it may be signaled in VPS/SPS/PPS/picture header/slice header/tile group header/tile header to indicate whether XT can be applied.

In one example, it may be signaled in VPS/SPS/PPS/picture header/slice header/tile group header/tile header to indicate which kinds of XT can be applied.

Whether to apply XT and/or which kind XT is applied may depend on the picture/slice type, such as I-slice or PM-slice.

In one embodiment, whether and/or how to use XT may depend on the position of the current block. For example, whether and how to use XT may depend on the whether the current block crosses the picture/tile/tile group border or not.

In one example, vertical XT is not allowed if the current block crosses the picture/tile/tile group/slice/subpicture bottom border.

In one example, horizontal XT is not allowed if the current block crosses the picture/tile/tile group/slice/subpicture bottom border.

In one example, vertical XT is not allowed if the current block crosses the picture/tile/tile group/slice/subpicture right border.

In one example, horizontal XT is not allowed if the current block crosses the picture/tile/tile group/slice/subpicture right border.

In one example, if a child block split by XT is totally out of the picture/tile/tile group/slice/subpicture, the child block may be omitted in the encoding/decoding process.

In one example, if a child block split by XT is partially out of the picture/tile/tile group/slice/subpicture, the following may apply The part out of the picture may be omitted in the encoding/decoding process.

The part inside the picture may be further split.

The part inside the picture may be coded as a CU.

Whether the part inside the picture is coded as a CU may depend on the width (w) and height (h) of the part.

In one example, the part inside the picture may be coded as a CU if $w=2^{nw}$, $h=2^{nh}$, where nw and nh are integers.

In one example, if any child block split by XT is partially/fully out of the picture/tile/tile group/slice/subpicture, XT is disallowed.

In one example, when XT or certain XT patterns is disallowed, the signalling of indication of the usage of the patterns is also skipped.

In one example, whether and/or how to apply XT split for a slice/picture may depend on the temporal layer of the slice/picture.

In one example, XT is not applied if the temporal layer is larger than a threshold, such as 2.

In one example, M kinds of XTs can be applied on a picture/slice with temporal layer larger than T and N kinds of XTs can be applied on a picture/slice with temporal layer smaller than or equal to T, wherein M is smaller than N. For example, T is equal to 2, M is equal to 2 and N is equal to 4.

Figure 15:
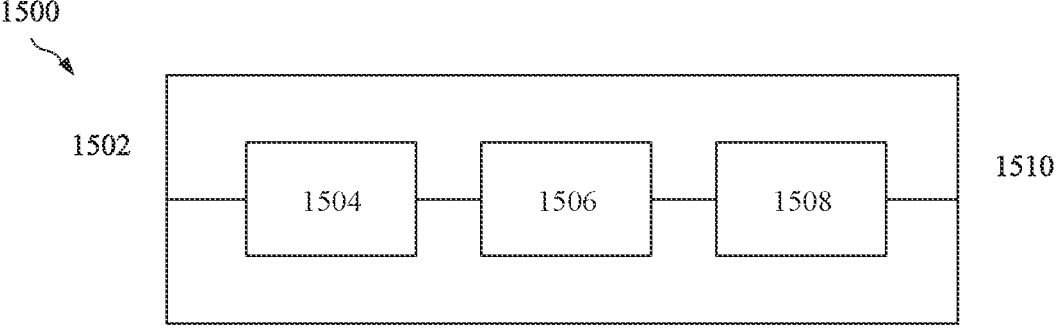
FIG. 15 is a block diagram showing an example video processing system.

FIG. 15 is a block diagram showing an example video processing system 1500 in which various techniques disclosed herein may be implemented. Various implementations may include some or all of the components of the system 1500. The system 1500 may include input 1502 for receiving video content. The video content may be received in a raw or uncompressed format, e.g., 8 or 10 bit multi-component pixel values, or may be in a compressed or encoded format. The input 1502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1500 may include a coding component 1504 that may implement the various coding or encoding methods described in the present document. The coding component 1504 may reduce the average bitrate of video from the input 1502 to the output of the coding component 1504 to produce a coded representation of the video. The coding techniques are therefore sometimes called video compression or video transcoding techniques. The output of the coding component 1504 may be either stored, or transmitted via a communication connected, as represented by the component 1506. The stored or communicated bitstream (or coded) representation of the video received at the input 1502 may be used by a component 1508 for generating pixel values or displayable video that is sent to a display interface 1510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 16:
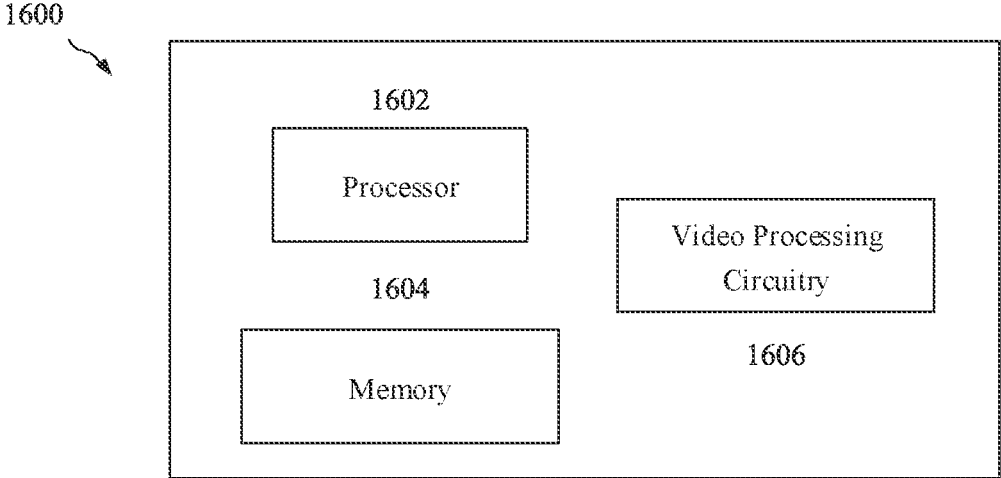
FIG. 16 is a block diagram of an example video processing apparatus.

FIG. 16 is a block diagram of an example video processing apparatus 1600. The apparatus 1600 may be used to implement one or more of the methods described herein. The apparatus 1600 may be embodied in a smartphone, tablet, computer, Internet of Things (IoT) receiver, and so on. The apparatus 1600 may include one or more processors 1602, one or more memories 1604 and video processing circuitry 1606. The processor(s) 1602 may be configured to implement one or more methods described in the present document. The memory (memories) 1604 may be used for storing data and code used for implementing the methods and techniques described herein. The video processing circuitry 1606 may be used to implement, in hardware circuitry, some techniques described in the present document. In some embodiments, the video processing circuitry 1806 may be at least partly included in the processor 1602, e.g., a graphics co-processor.

Figure 17:
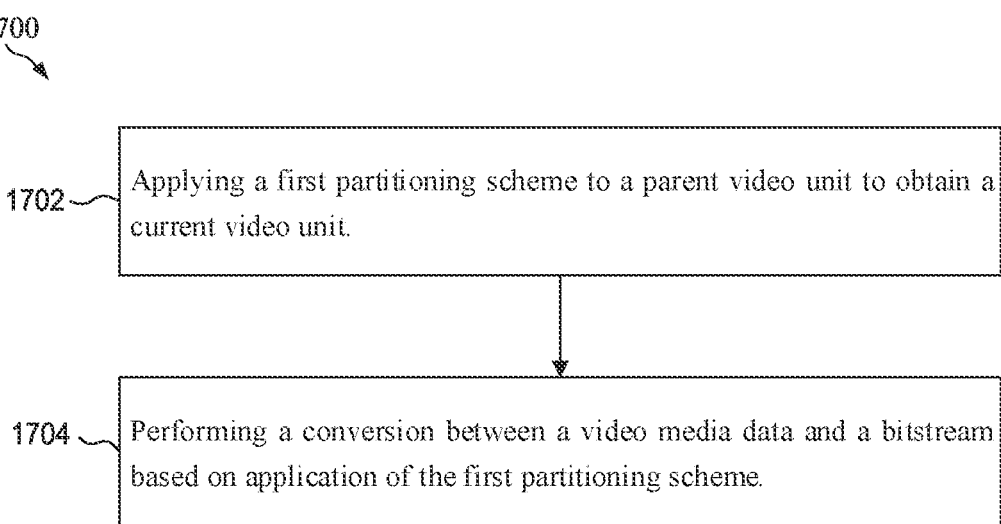
FIG. 17 is a flowchart for an example method of video processing.

FIG. 17 is a flowchart for an example method 1700 of video processing. The method 1700 includes applying a first partitioning scheme to a parent video unit to obtain a current video unit, at step 1702. At step 1704, the method includes performing a conversion between a video media data and a bitstream based on application of the first partitioning scheme. For example, step 1702 may include selecting equations and/or algorithms for use as described above. Step 1704 can then include performing video encoding at an encoder or video decoding at a decoder, for example by employing the results determined by the equations and/or algorithms.

Figure 21:
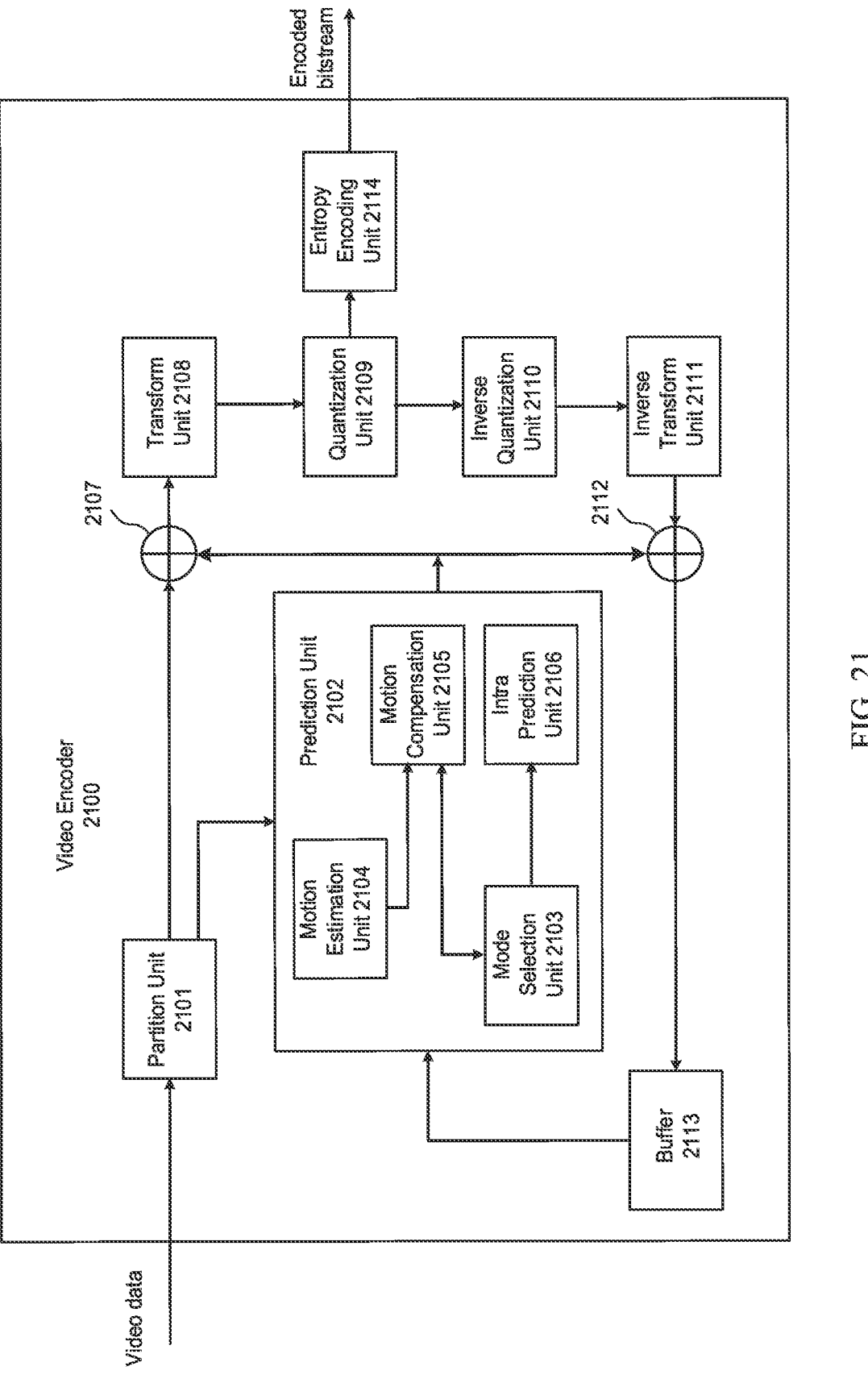
FIG. 21 is a block diagram that illustrates an example video encoder.
Figure 22:
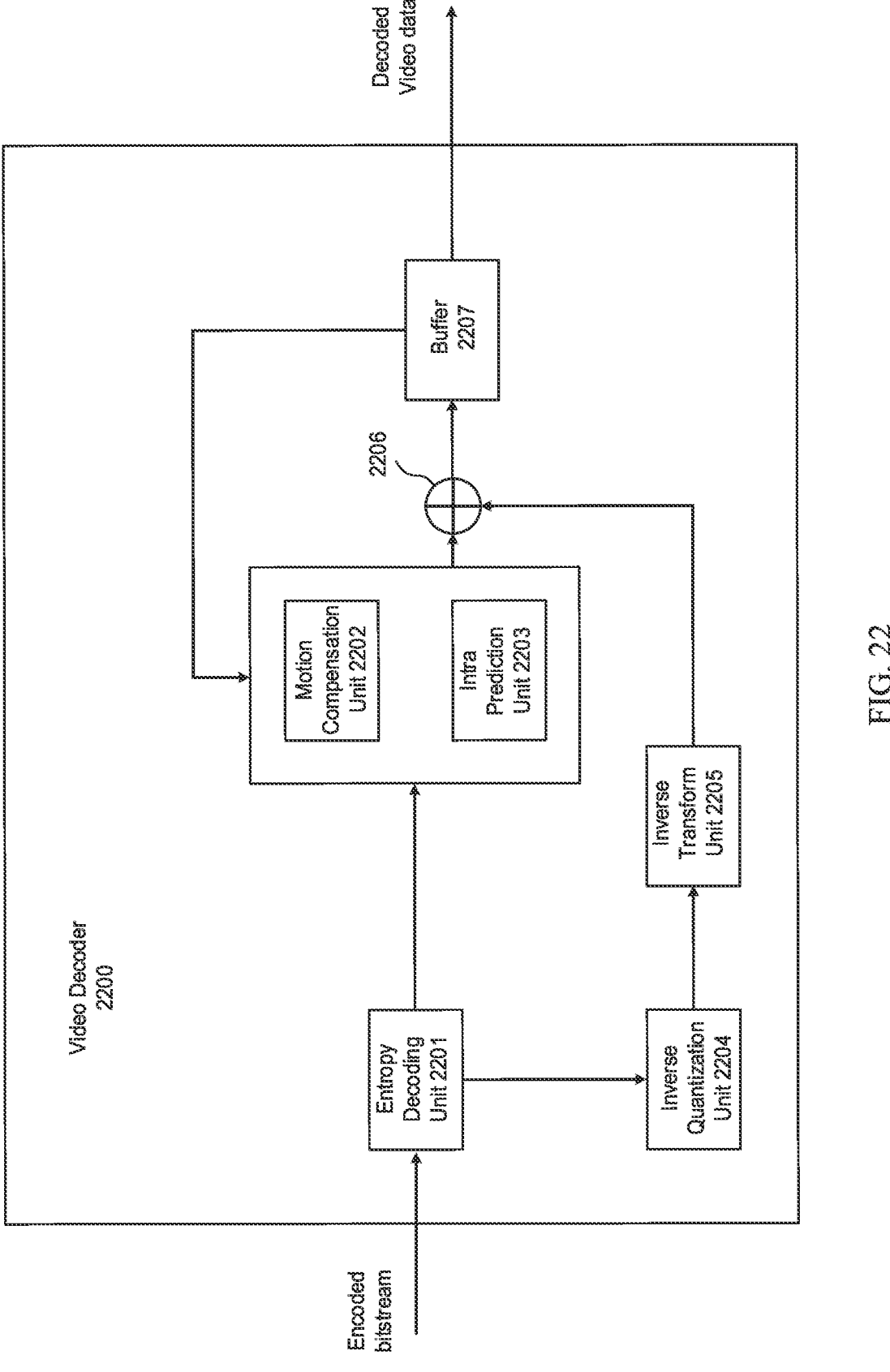
FIG. 22 is a block diagram that illustrates an example video decoder.
Figure 23:
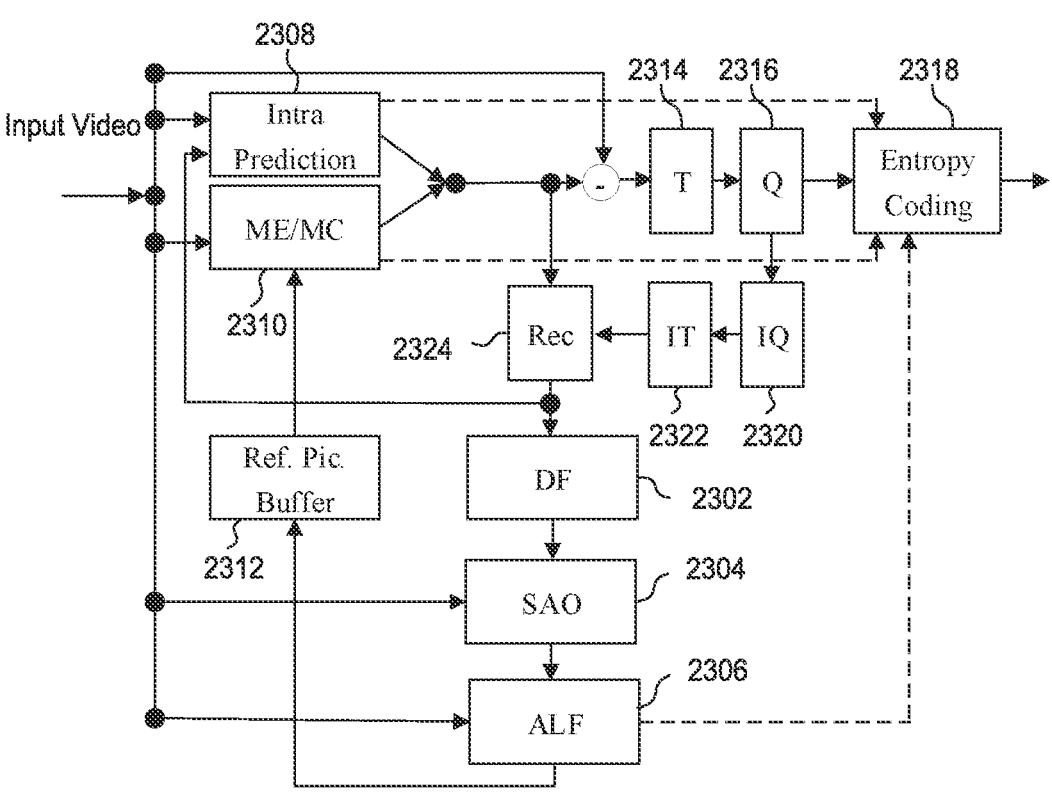
FIG. 23 is a schematic diagram of an example encoder.

It should be noted that the method 1700 can be implemented in an apparatus for processing video data comprising a processor and a non-transitory memory with instructions thereon, such as video encoder 2100, video decoder 2200, and/or encoder 2300 described in FIGS. 21-23. In such a case, the instructions upon execution by the processor, cause the processor to perform the method 1700. Further, the method 1700 can be performed by a non-transitory computer readable medium comprising a computer program product for use by a video coding device. The computer program product comprises computer executable instructions stored on the non-transitory computer readable medium such that when executed by a processor cause the video coding device to perform the method 1900.

FIG. 18 is a flowchart of another example method 1800 of video processing. The method 1800 includes applying a first partitioning scheme to a parent video unit to obtain a current video unit, at step 1802. At step 1804, the method includes performing a conversion between a video media data and a bitstream based on application of the first partitioning scheme. In this embodiment, the method further includes, at step 1806, partitioning the current video unit using a second partitioning scheme where at least one of the first partitioning scheme or the second partitioning scheme is an XT partitioning scheme different from binary tree (BT), ternary tree (TT), or quadtree (QT) partitioning. In still other embodiments, the current video unit may be partitioned using a second partitioning scheme where at most one of the first partitioning scheme or the second partitioning scheme is an XT partitioning scheme that is different from binary tree (BT), ternary tree (TT), or quadtree (QT) partitioning It should be noted that the method 1800 can be implemented in an apparatus for processing video data comprising a processor and a non-transitory memory with instructions thereon, such as video encoder 2100, video decoder 2200, and/or encoder 2300.

FIG. 19 is a flowchart of another example method 1900 of video processing. The method 1900 includes applying a first partitioning scheme to a parent video unit to obtain a current video unit, at step 1902. At step 1904, the method includes performing a conversion between a video media data and a bitstream based on application of the first partitioning scheme. In this embodiment, the method includes, at step 1906, further partitioning of the current video unit is disabled when the first partitioning scheme is an XT partitioning scheme that is different from binary tree (BT), ternary tree (TT), or quadtree (QT) partitioning. In other embodiments, a depth to which the current video unit is further partitioned is based on a parent depth of the parent video unit due to the current video unit being obtained from the parent video unit by the first partitioning scheme, and wherein the first partitioning scheme is an XT partitioning scheme that is a different partitioning scheme than (BT), ternary tree (TT), or quadtree (QT) partitioning. In still a further embodiment, whether or how to apply an XT partitioning scheme depends on a coding condition of the current video unit, wherein the XT partitioning scheme is different than quadtree (QT), binary tree (BT), or ternary tree (TT). It should be noted that all the embodiments of method 1900 can be implemented in an apparatus for processing video data comprising a processor and a non-transitory memory with instructions thereon, such as video encoder 2100, video decoder 2200, and/or encoder 2300 (FIGS. 21-23).

Figure 20:
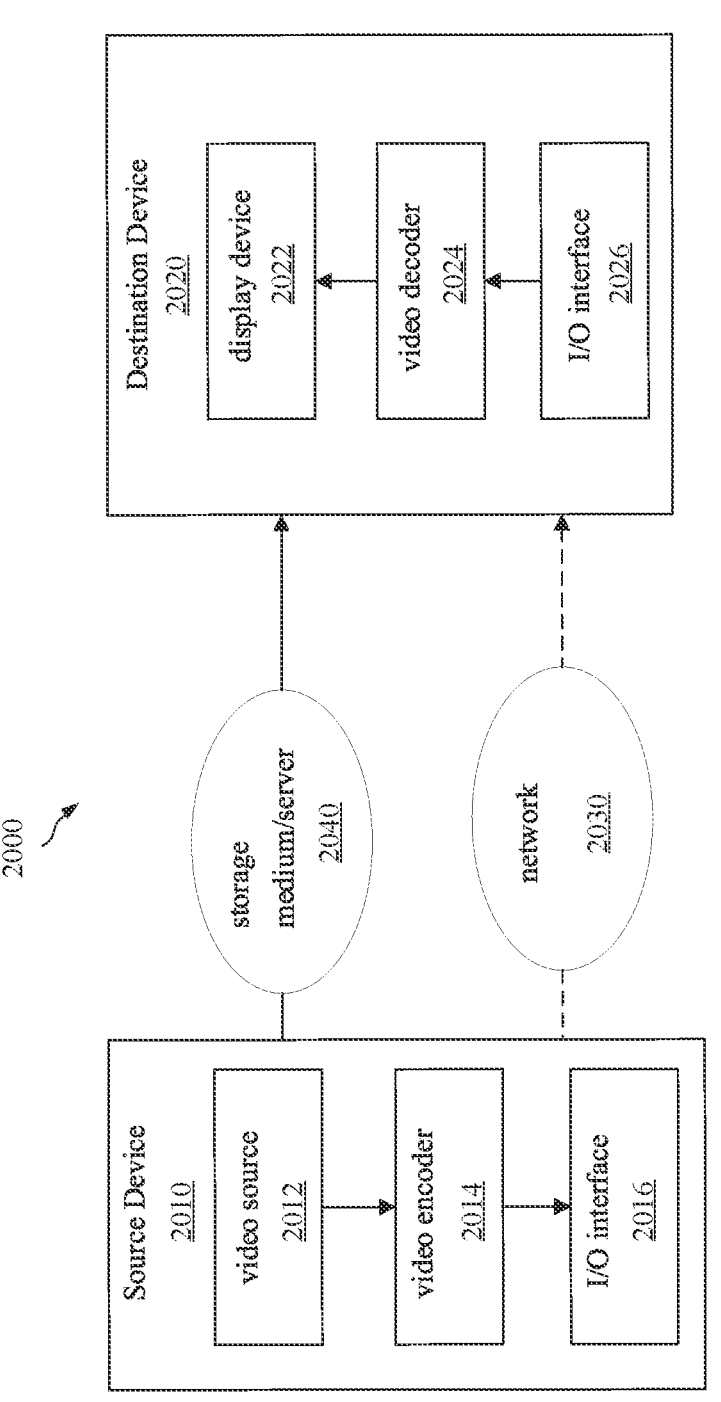
FIG. 20 is a block diagram that illustrates an example video coding system.

FIG. 20 is a block diagram that illustrates an example video coding system 2000 that may utilize the techniques of this disclosure. As shown in FIG. 20, video coding system 2000 may include a source device 2010 and a destination device 2020. Source device 2010 generates encoded video data which may be referred to as a video encoding device. Destination device 2020 may decode the encoded video data generated by source device 2010 which may be referred to as a video decoding device.

Source device 2010 may include a video source 2012, a video encoder 2014, and an input/output (I/O) interface 2016. Video source 2012 may include a source such as a video capture device, an interface to receive video data from a video content provider, and/or a computer graphics system for generating video data, or a combination of such sources. The video data may comprise one or more pictures. Video encoder 2014 encodes the video data from video source 2012 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2016 may include a modulator/demodulator (modem) and/or a transmitter. The encoded video data may be transmitted directly to destination device 2020 via I/O interface 2016 through network 2030. The encoded video data may also be stored onto a storage medium/server 2040 for access by destination device 2020.

Destination device 2020 may include an I/O interface 2026, a video decoder 2024, and a display device 2022. I/O interface 2026 may include a receiver and/or a modem. I/O interface 2026 may acquire encoded video data from the source device 2010 or the storage medium/server 2040. Video decoder 2024 may decode the encoded video data. Display device 2022 may display the decoded video data to a user. Display device 2022 may be integrated with the destination device 2020, or may be external to destination device 2020, which can be configured to interface with an external display device.

Video encoder 2014 and video decoder 2024 may operate according to a video compression standard, such as the High Efficiency Video Coding (HEVC) standard, Versatile Video Coding (VVM) standard and other current and/or further standards.

FIG. 21 is a block diagram illustrating an example of video encoder 2100, which may be video encoder 2014 in the system 2000 illustrated in FIG. 20. Video encoder 2100 may be configured to perform any or all of the techniques of this disclosure. In the example of FIG. 21, video encoder 2100 includes a plurality of functional components. The techniques described in this disclosure may be shared among the various components of video encoder 2100. In some examples, a processor may be configured to perform any or all of the techniques described in this disclosure.

The functional components of video encoder 2100 may include a partition unit 2101, a prediction unit 2102 which may include a mode selection unit 2103, a motion estimation unit 2104, a motion compensation unit 2105, an intra prediction unit 2106, a residual generation unit 2107, a transform unit 2108, a quantization unit 2109, an inverse quantization unit 2110, an inverse transform unit 2111, a reconstruction unit 2112, a buffer 2113, and an entropy encoding unit 2114.

In other examples, video encoder 2100 may include more, fewer, or different functional components. In an example, prediction unit 2102 may include an intra block copy (IBC)

unit. The IBC unit may perform prediction in an IBC mode in which at least one reference picture is a picture where the current video block is located.

Furthermore, some components, such as motion estimation unit 2104 and motion compensation unit 2105 may be highly integrated, but are represented in the example of FIG. 21 separately for purposes of explanation.

Partition unit 2101 may partition a picture into one or more video blocks. Video encoder 2100 and video decoder 2200 may support various video block sizes.

Mode selection unit 2103 may select one of the coding modes, intra or inter, e.g., based on error results, and provide the resulting intra or inter coded block to a residual generation unit 2107 to generate residual block data and to a reconstruction unit 2112 to reconstruct the encoded block for use as a reference picture. In some examples, mode selection unit 2103 may select a combination of intra and inter prediction (CIIP) mode in which the prediction is based on an inter prediction signal and an intra prediction signal. Mode selection unit 2103 may also select a resolution for a motion vector (e.g., a sub-pixel or integer pixel precision) for the block in the case of inter prediction.

To perform inter prediction on a current video block, motion estimation unit 2104 may generate motion information for the current video block by comparing one or more reference frames from buffer 2113 to the current video block. Motion compensation unit 2105 may determine a predicted video block for the current video block based on the motion information and decoded samples of pictures from buffer 2113 other than the picture associated with the current video block.

Motion estimation unit 2104 and motion compensation unit 2105 may perform different operations for a current video block, for example, depending on whether the current video block is in an I slice, a P slice, or a B slice.

In some examples, motion estimation unit 2104 may perform uni-directional prediction for the current video block, and motion estimation unit 2104 may search reference pictures of list 0 or list 1 for a reference video block for the current video block. Motion estimation unit 2104 may then generate a reference index that indicates the reference picture in list 0 or list 1 that contains the reference block and a motion vector that indicates a spatial displacement between the current video block and the reference video block. Motion estimation unit 2104 may output the reference index, a prediction direction indicator, and the motion vector as the motion information of the current video block. Motion compensation unit 2105 may generate the predicted video block of the current block based on the reference video block indicated by the motion information of the current video block.

In other examples, motion estimation unit 2104 may perform bi-directional prediction for the current video block, motion estimation unit 2104 may search the reference pictures in list 0 for a reference video block for the current video block and may also search the reference pictures in list 1 for another reference video block for the current video block. Motion estimation unit 2104 may then generate reference indexes that indicate the reference pictures in list 0 and list 1 containing the reference video blocks and motion vectors that indicate spatial displacements between the reference video blocks and the current video block. Motion estimation unit 2104 may output the reference indexes and the motion vectors of the current video block as the motion information of the current video block. Motion compensation unit 2105 may generate the predicted video block of the current video block based on the reference video blocks indicated by the motion information of the current video block.

In some examples, motion estimation unit 2104 may output a full set of motion information for decoding processing of a decoder. In some examples, motion estimation unit 2104 may not output a full set of motion information for the current video. Rather, motion estimation unit 2104 may signal the motion information of the current video block with reference to the motion information of another video block. For example, motion estimation unit 2104 may determine that the motion information of the current video block is sufficiently similar to the motion information of a neighboring video block.

In one example, motion estimation unit 2104 may indicate, in a syntax structure associated with the current video block, a value that indicates to the video decoder 2200 that the current video block has the same motion information as another video block.

In another example, motion estimation unit 2104 may identify, in a syntax structure associated with the current video block, another video block and a motion vector difference (MVD). The motion vector difference indicates a difference between the motion vector of the current video block and the motion vector of the indicated video block. The video decoder 2200 may use the motion vector of the indicated video block and the motion vector difference to determine the motion vector of the current video block.

As discussed above, video encoder 2100 may predictively signal the motion vector. Two examples of predictive signaling techniques that may be implemented by video encoder 2100 include advanced motion vector prediction (AMVP) and merge mode signaling.

Intra prediction unit 2106 may perform intra prediction on the current video block. When intra prediction unit 2106 performs intra prediction on the current video block, intra prediction unit 2106 may generate prediction data for the current video block based on decoded samples of other video blocks in the same picture. The prediction data for the current video block may include a predicted video block and various syntax elements.

Residual generation unit 2107 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 2107 may not perform the subtracting operation.

Transform unit 2108 may generate one or more transform coefficient video blocks for the current video block by applying one or more transforms to a residual video block associated with the current video block.

After transform unit 2108 generates a transform coefficient video block associated with the current video block, quantization unit 2109 may quantize the transform coefficient video block associated with the current video block based on one or more quantization parameter (QP) values associated with the current video block.

Inverse quantization unit 2110 and inverse transform unit 2111 may apply inverse quantization and inverse transforms to the transform coefficient video block, respectively, to reconstruct a residual video block from the transform coefficient video block. Reconstruction unit 2112 may add the reconstructed residual video block to corresponding samples from one or more predicted video blocks generated by the prediction unit 2102 to produce a reconstructed video block associated with the current block for storage in the buffer 2113.

After reconstruction unit 2112 reconstructs the video block, the loop filtering operation may be performed to reduce video blocking artifacts in the video block.

Entropy encoding unit 2114 may receive data from other functional components of the video encoder 2100. When entropy encoding unit 2114 receives the data, entropy encoding unit 2114 may perform one or more entropy encoding operations to generate entropy encoded data and output a bitstream that includes the entropy encoded data.

FIG. 22 is a block diagram illustrating an example of video decoder 2200 which may be video decoder 2024 in the system 2000 illustrated in FIG. 20.

The video decoder 2200 may be configured to perform any or all of the techniques of this disclosure. In the example of FIG. 22, the video decoder 2200 includes a plurality of functional components. The techniques described in this disclosure may be shared among the various components of the video decoder 2200. In some examples, a processor may be configured to perform any or all of the techniques described in this disclosure.

In the example of FIG. 22, video decoder 2200 includes an entropy decoding unit 2201, a motion compensation unit 2202, an intra prediction unit 2203, an inverse quantization unit 2204, an inverse transformation unit 2205, a reconstruction unit 2206, and a buffer 2207. Video decoder 2200 may, in some examples, perform a decoding pass generally reciprocal to the encoding pass described with respect to video encoder 2100 (FIG. 21).

Entropy decoding unit 2201 may retrieve an encoded bitstream. The encoded bitstream may include entropy coded video data (e.g., encoded blocks of video data). Entropy decoding unit 2201 may decode the entropy coded video data, and from the entropy decoded video data, motion compensation unit 2202 may determine motion information including motion vectors, motion vector precision, reference picture list indexes, and other motion information. Motion compensation unit 2202 may, for example, determine such information by performing the AMVP and merge mode.

Motion compensation unit 2202 may produce motion compensated blocks, possibly performing interpolation based on interpolation filters. Identifiers for interpolation filters to be used with sub-pixel precision may be included in the syntax elements.

Motion compensation unit 2202 may use interpolation filters as used by video encoder 2100 during encoding of the video block to calculate interpolated values for sub-integer pixels of a reference block. Motion compensation unit 2202 may determine the interpolation filters used by video encoder 2100 according to received syntax information and use the interpolation filters to produce predictive blocks.

Motion compensation unit 2202 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 2203 may use intra prediction modes for example received in the bitstream to form a prediction block from spatially adjacent blocks. Inverse quantization unit 2204 inverse quantizes, i.e., de-quantizes, the quantized video block coefficients provided in the bitstream and decoded by entropy decoding unit 2201. Inverse transform unit 2205 applies an inverse transform.

Reconstruction unit 2206 may sum the residual blocks with the corresponding prediction blocks generated by motion compensation unit 2202 or intra prediction unit 2203 to form decoded blocks. If desired, a deblocking filter may also be applied to filter the decoded blocks in order to remove blockiness artifacts. The decoded video blocks are then stored in buffer 2207, which provides reference blocks for subsequent motion compensation/intra prediction and also produces decoded video for presentation on a display device.

FIG. 23 is a schematic diagram of an example encoder 2300. The encoder 2300 is suitable for implementing the techniques of VVC. The encoder 2300 includes three in-loop filters, namely a deblocking filter (DF) 2302, a sample adaptive offset (SAO) filter 2304, and an adaptive loop filter (ALF) 2306. Unlike the DF 2302, which uses predefined filters, the SAO filter 2304 and the ALF 2306 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 2306 is located at the last processing stage of each picture and can be regarded as a tool trying to catch and fix artifacts created by the previous stages.

The encoder 2300 further includes an intra prediction component 2308 and a motion estimation/compensation (ME/MC) component 2310 configured to receive input video. The intra prediction component 2308 is configured to perform intra prediction, while the ME/MC component 2310 is configured to utilize reference pictures obtained from a reference picture buffer 2312 to perform inter prediction. Residual blocks from inter prediction or intra prediction are fed into a transform (T) component 2314 and a quantization (Q) component 2316 to generate quantized residual transform coefficients, which are fed into an entropy coding component 2318. The entropy coding component 2318 entropy codes the prediction results and the quantized transform coefficients and transmits the same toward a video decoder (not shown). Quantization components output from the quantization component 2316 may be fed into an inverse quantization (IQ) components 2320, an inverse transform component 2322, and a reconstruction (REC) component 2324. The REC component 2324 is able to output images to the DF 2302, the SAO filter 2304, and the ALF 2306 for filtering prior to those images being stored in the reference picture buffer 2312.

A listing of solutions according to some embodiment is provided. The following solutions show examples of techniques discussed herein.

1. A video processing method, comprising: determining, for a conversion between a video block of a video and a bitstream of the video to partition the video block according to a rule; and performing the conversion according to the determining; wherein the video block is obtained from a parent video block by a first partitioning scheme and wherein the video block is partitioned using a second partitioning scheme, and wherein the rule specifies that at least one of the first partitioning scheme or the second partitioning scheme is an XT partitioning scheme that is different from binary tree (BT), ternary tree (TT) or quadtree (QT) partitioning.

2. The method of solution 1, wherein the XT partitioning scheme is an unsymmetrical binary partitioning tree (UBT) or an unsymmetrical quadtree partitioning tree (UQT) or an extended quadtree (EQT) or an extended ternary tree (ETT) partitioning scheme.

3. The method of solution 2, wherein the first partitioning scheme is BT, TT, QT, UBT, UQT, EQT, or ETT.

4. The method of solution 2, wherein the second partitioning scheme is BT, TT, QT, UBT UQT EQT or ETT.

5. A video processing method, comprising: determining, for a conversion between a video block of a video and a bitstream of the video to partition the video block according to a rule; and performing the conversion according to the determining; wherein the video block is obtained from a parent video block by a first partitioning scheme and wherein the video block is partitioned using a second partitioning scheme, and wherein the rule specifies that at most one of the first partitioning scheme or the second partitioning scheme is an XT partitioning scheme that is different from binary tree (BT), ternary tree (TT) or quadtree (QT) partitioning.

6. The method of solution 5, wherein the XT partitioning scheme is an unsymmetrical binary partitioning (UBT) or an unsymmetrical quadtree partitioning (UQT) or an extended quadtree (EQT) or an extended ternary tree (ETT) partitioning scheme.

7. The method of solution 6, wherein the first partitioning scheme is BT, TT, QT, UBT, UQT, EQT, or ETT.

8. The method of solution 6, wherein the second partitioning scheme is BT, TT, QT, UBT UQT EQT or ETT.

9. A video processing method, comprising: determining, for a conversion between a video block of a video and a bitstream of the video whether to partition the video block according to a rule; and performing the conversion according to the determining; wherein the rule specifies that when the video block being split from a parent block using a specific partitioning scheme, referred to as XT partitioning scheme, further partitioning of the video block is disabled.

10. The method of solution 9, wherein the rule further specifies that an indication of the bitstream omits an indication of the further partitioning.

11. The method of solution 9, wherein the rule specifies that the video block is treated as a leaf node.

12. A video processing method, comprising: determining, for a conversion between a video block of a video and a bitstream of the video whether or how to partition the video block according to a rule; and performing the conversion according to the determining; wherein the rule specifies that a depth to which the video block is further partitioned is responsive to a parent depth of a parent block due to the video block being obtained from the parent block by a particular type of partitioning scheme called XT partitioning scheme.

13. The method of solution 12, wherein the XT partitioning scheme is different from binary tree (BT), ternary tree (TT) or quadtree (QT) partitioning.

14. The method of any of solutions 12-13, wherein the XT partitioning scheme is an unsymmetrical binary partitioning (UBT) or an unsymmetrical quadtree partitioning (UQT) or an extended quadtree (EQT) or an extended ternary tree (ETT) partitioning scheme.

15. The method of any of solutions 12-14, wherein the video block is further partitioned using a partitioning scheme comprising quadtree (QT) or binary tree (BT) or ternary tree (TT) or extended tree (ET) or multi-type tree (MTT) partitioning.

16. The method of solution 15, wherein the rule specifies that the depth for at least some of QT, BT, TT, ET or MTT are different from each other.

17. A video processing method, comprising: determining, for a conversion between a video block of a video and a bitstream of the video whether or how to partition the video block according to a rule; and performing the conversion according to the determining; wherein the rule specifies whether or how a specific partitioning scheme, called XT partitioning scheme, is applied depends on a coding condition of the video block; wherein the XT partitioning scheme is different from quadtree (QT) or binary tree (BT) or ternary tree (TT).

18. The method of solution 17, wherein the coding condition comprises a width W, a height H or a partitioning depth of the video block.

19. The method of solutions 17-18, wherein the rule disallows the XT partitioning the video block if a resulting child block would cross more than one virtual pipeline data units (VPDUs).

20. The method of any of solutions 17-19, wherein the rule disallowed the XT partitioning for certain values of the width W or the height H.

21. The method of any of solutions 17-19, wherein the rule disallowed the XT partitioning for certain values of the depth.

22. The method of solution 17, wherein the coding condition comprises a coding information associated with a sequence or a temporal layer or a picture or a slice or a block that includes the video block.

23. The method of solution 21, wherein the coding condition comprises a color format of the video or a color component of the video block.

24. The method of solution 21, wherein the coding condition comprises a type of the slice or a position of the video block within the picture.

25. The method of solution 23, wherein the rule specifies whether a vertical or a horizontal type of the XT partitioning scheme is allowed based on the position.

26. The method of solution 21, wherein the rule disables the XT partitioning scheme in case that the temporal layer is larger than a threshold value.

27. The method of any of solutions 1-26, wherein the conversion includes generating the bitstream from the video or generating the video from the bitstream.

28. A method of storing a bitstream on a computer-readable medium, comprising generating a bitstream according to a method recited in any one or more of solutions 1-25 and storing the bitstream on the computer-readable medium.

29. A computer-readable medium having a bitstream of a video stored thereon, the bitstream, when processed by a processor of a video decoder, causing the video decoder to generate the video, wherein the bitstream is generated according to a method recited in one or more of solutions 1-28.

30. A video decoding apparatus comprising a processor configured to implement a method recited in one or more of solutions 1 to 28.

31. A video encoding apparatus comprising a processor configured to implement a method recited in one or more of solutions 1 to 28.

32. A computer program product having computer code stored thereon, the code, when executed by a processor, causes the processor to implement a method recited in any of solutions 1 to 28.

33. A computer readable medium on which a bitstream complying to a bitstream format that is generated according to any of solutions 1 to 28.

34. A method, an apparatus, and a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:

for a conversion between a video unit of a video and a bitstream of the video, applying at least one partitioning scheme to the video unit according to a rule; and performing the conversion based on application of the at least one partitioning scheme, wherein the rule specifies that a current block, in the video unit, which is applied with a first partitioning scheme is further applied with a second partitioning scheme;

wherein at least one of the first partitioning scheme or the second partitioning scheme is one of an unsymmetrical binary tree (UBT) partitioning scheme or an extended ternary tree (ETT) partitioning scheme or an extended quadtree (EQT) partitioning scheme or other partitioning schemes excluding a quadtree (QT) partitioning scheme, a binary tree (BT) partitioning scheme, and a ternary tree (TT) partitioning scheme;

wherein the rule further specifies that in a case that a parent block in the video unit is partitioned into child blocks by a sixth partitioning scheme, a partitioning depth of at least one of the child blocks is based on a partitioning depth of the parent block; and wherein the sixth partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme.

2. The method of claim 1, wherein the first partitioning scheme is the QT partitioning scheme, the BT partitioning scheme, the TT partitioning scheme, the ETT partitioning scheme, an unsymmetrical quadtree (UQT) partitioning scheme, the UBT partitioning scheme, or the EQT partitioning scheme, and the second partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme; or the first partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme, and the second partitioning scheme is the QT partitioning scheme, the BT partitioning scheme, the TT partitioning scheme, the UQT partitioning scheme, the UBT partitioning scheme, the ETT partitioning scheme, or the EQT partitioning scheme.

3. The method of claim 1, wherein the rule further specifies that a current block, in the video unit, which is applied with a third partitioning scheme is disallowed to be further applied with a fourth partitioning scheme; and wherein at least one of the third partitioning scheme or the fourth partitioning scheme is one of an unsymmetrical binary tree (UBT) partitioning scheme or an extended ternary tree (ETT) partitioning scheme or an extended quadtree (EQT) partitioning scheme or other partitioning schemes excluding a quadtree (QT) partitioning scheme, a binary tree (BT) partitioning scheme, and a ternary tree (TT) partitioning scheme.

4. The method of claim 3, wherein the third partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme, and the fourth partitioning scheme is the QT partitioning scheme or the EQT partitioning scheme; or the third partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme, and the fourth partitioning scheme is the BT partitioning scheme or the UBT partitioning scheme; or the third partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme, and the fourth partitioning scheme is the TT partitioning scheme or the ETT partitioning scheme; or the third partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme, and the fourth partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme.

5. The method of claim 1, wherein the rule further specifies that a current block, in the video unit, which is partitioned from a parent block by a fifth partitioning scheme, is disallowed to be further partitioned into child blocks; and wherein the fifth partitioning scheme is one of an unsymmetrical binary tree (UBT) partitioning scheme or an extended ternary tree (ETT) partitioning scheme or an extended quadtree (EQT) partitioning scheme or other partitioning schemes excluding a quadtree (QT) partitioning scheme, a binary tree (BT) partitioning scheme, and a ternary tree (TT) partitioning scheme.

6. The method of claim 5, wherein a syntax element that indicates application of further partitioning schemes is not present in the bitstream; or the current block is treated as a leaf node.

7. The method of claim 1, wherein the parent block is applied with a seventh partitioning scheme, the seventh partitioning scheme is the QT partitioning scheme, the BT partitioning scheme, the TT partitioning scheme, a preset partitioning scheme, or a multi-type tree (MTT) partitioning scheme;

wherein the preset partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme; and wherein partitioning due to the sixth partitioning scheme is used to update depths of the QT partitioning scheme, the BT partitioning scheme, the TT partitioning scheme, the preset partitioning scheme, and the MTT partitioning scheme.

8. The method of claim 7, wherein increasement methods of the depths of the QT partitioning scheme, the BT partitioning scheme, the TT partitioning scheme, the preset partitioning scheme, and the MTT partitioning scheme for different child blocks are different.

9. The method of claim 1, wherein the rule further specifies whether or how to apply an eighth partitioning scheme depends on a coding condition of the video unit; and wherein the eighth partitioning scheme is one of an unsymmetrical binary tree (UBT) partitioning scheme or an extended ternary tree (ETT) partitioning scheme or an extended quadtree (EQT) partitioning scheme or other partitioning schemes excluding a quadtree (QT) partitioning scheme, a binary tree (BT) partitioning scheme, and a ternary tree (TT) partitioning scheme.

10. The method of claim 9, wherein the coding condition comprises a width, a height, or a partitioning depth of a current block in the video unit.

11. The method of claim 10, wherein the eighth partitioning scheme is not allowed in a case that a child block crosses more than one virtual pipeline data unit (VPDU); or the eighth partitioning scheme is not allowed in a case that the width or the height of a current block in the video unit satisfies one or more first conditions; or the eighth partitioning scheme is allowed in a case that the width or the height of the current block in the video unit satisfies one or more second conditions; or the eighth partitioning scheme is not allowed in a case that the partitioning depth of the current block in the video unit satisfies one or more third conditions; or the eighth partitioning scheme is allowed in a case that the partitioning depth of the current block in the video unit satisfies one or more fourth conditions.

12. The method of claim 9, wherein the coding condition comprises coding information associated with different levels.

13. The method of claim 12, wherein the coding information is associated with a sequence, a temporal layer, a picture, a slice, or a block.

14. The method of claim 13, wherein the coding information comprises color format and/or color components, and the color format is 4:4:4 or 4:2:0; or a first syntax element indicating a type of the eighth partitioning scheme is transmitted from an encoder to a decoder; or the coding information comprises a picture type and/or a slice type, the type of the eighth partitioning scheme is based on the coding information, and the slice type comprises I-slice or P/B-slice; or the coding information comprises a position of a current block in the video unit, and whether or how to apply the eighth partitioning scheme depends on whether the current block crosses picture border, tile border, or tile group border; or the coding information comprises a temporal layer of a slice or a picture, and whether or how to apply the eighth partitioning scheme for the slice or the picture depends on the coding information.

15. The method of claim 1, wherein the conversion comprises encoding the video into the bitstream.

16. The method of claim 1, wherein the conversion comprises decoding the bitstream to generate the video.

17. An apparatus for processing video data comprising a processor and a non-transitory memory with instructions thereon, wherein the instructions upon execution by the processor, cause the processor to:

apply, for a conversion between a video unit of a video and a bitstream of the video, at least one partitioning scheme to the video unit according to a rule; and perform the conversion based on application of the at least one partitioning scheme, wherein the rule specifies that a current block, in the video unit, which is applied with a first partitioning scheme is further applied with a second partitioning scheme;

wherein at least one of the first partitioning scheme or the second partitioning scheme is one of an unsymmetrical binary tree (UBT) partitioning scheme or an extended ternary tree (ETT) partitioning scheme or an extended quadtree (EQT) partitioning scheme or other partitioning schemes excluding a quadtree (QT) partitioning scheme, a binary tree (BT) partitioning scheme, and a ternary tree (TT) partitioning scheme;

wherein the rule further specifies that in a case that a parent block in the video unit is partitioned into child blocks by a sixth partitioning scheme, a partitioning depth of at least one of the child blocks is based on a partitioning depth of the parent block; and wherein the sixth partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme.

18. A non-transitory computer-readable recording medium storing a bitstream of a video which is generated by a method performed by a video processing apparatus, wherein the method comprises:

applying at least one partitioning scheme to a video unit of the video according to a rule; and generating the bitstream based on application of the at least one partitioning scheme, wherein the rule specifies that a current block, in the video unit, which is applied with a first partitioning scheme is further applied with a second partitioning scheme;

wherein at least one of the first partitioning scheme or the second partitioning scheme is one of an unsymmetrical binary tree (UBT) partitioning scheme or an extended ternary tree (ETT) partitioning scheme or an extended quadtree (EQT) partitioning scheme or other partitioning schemes excluding a quadtree (QT) partitioning scheme, a binary tree (BT) partitioning scheme, and a ternary tree (TT) partitioning scheme;

wherein the rule further specifies that in a case that a parent block in the video unit is partitioned into child blocks by a sixth partitioning scheme, a partitioning depth of at least one of the child blocks is based on a partitioning depth of the parent block; and wherein the sixth partitioning scheme is one of the UBT partitioning scheme or the ETT partitioning scheme or the EQT partitioning scheme or other partitioning schemes excluding the QT partitioning scheme, the BT partitioning scheme, and the TT partitioning scheme.

*     *     *     *     *